United States Patent
Qiao et al.

(10) Patent No.: US 7,889,995 B2
(45) Date of Patent: Feb. 15, 2011

(54) IN-SERVICE OPTICAL DISPERSION DETERMINING SYSTEM AND METHOD

(75) Inventors: Lijie Qiao, Ottawa (CA); Ahmad Atieh, Nepean (CA); John Mills, Ottawa (CA)

(73) Assignee: BTI Systems Inc., Ottawa, Ontario (CA)

( * ) Notice: Subject to any disclaimer, the term of this patent is extended or adjusted under 35 U.S.C. 154(b) by 641 days.

(21) Appl. No.: 11/892,686

(22) Filed: Aug. 27, 2007

(65) Prior Publication Data

US 2009/0060523 A1    Mar. 5, 2009

(51) Int. Cl.
*H04J 14/02* (2006.01)
*H04B 10/18* (2006.01)

(52) U.S. Cl. .................. 398/159; 308/81; 308/147

(58) Field of Classification Search ............ 398/81, 398/141, 147, 159, 161
See application file for complete search history.

(56) References Cited

U.S. PATENT DOCUMENTS

| | | | |
|---|---|---|---|
| 5,923,455 A * | 7/1999 | Rokugawa | 398/202 |
| 5,930,414 A * | 7/1999 | Fishman et al. | 385/11 |
| 6,204,926 B1 | 3/2001 | Maznev et al. | |
| 7,088,925 B1 | 8/2006 | Noe | |
| 7,477,848 B2 * | 1/2009 | Ooi et al. | 398/147 |
| 2002/0176129 A1 | 11/2002 | Dinu et al. | |
| 2005/0047791 A1 * | 3/2005 | Miyazaki | 398/147 |

OTHER PUBLICATIONS

H. Y. Pua, K. Peddanarappagari, B. Zhu, C. Allen, K. Demarest, and R. Hui, "An adaptive first-order polarization-mode dispersion compensation system aided by polarization scrambling: Theory and demonstration," J. Lightwave Technol., vol. 18, pp. 832-841, Jun. 2000.

* cited by examiner

*Primary Examiner*—Leslie Pascal

(57) ABSTRACT

A system and method for in-service optical dispersion determination are provided. Optical dispersion is determined by splitting a first optical signal into two components, introducing a time delay between the two components such that corresponding pulses of the two components partially overlap, combining the two components to generate a combined optical signal comprising a first component and a second component, determining power of the combined optical signal while applying a plurality of dispersion compensation values, in order to determine a dispersion compensation value that results in a minimum detected power of the combined optical signal. Polarization Mode Dispersion is determined by adjusting the time delay that is introduced until the power of the combined optical signal is substantially equal for all of the plurality of dispersion compensation values.

28 Claims, 10 Drawing Sheets

IN-SERVICE OPTICAL DISPERSION DETERMINING SYSTEM AND METHOD

FIELD OF THE INVENTION

The invention pertains to the field of optical communications, and more particularly to determining optical dispersion.

BACKGROUND OF THE INVENTION

As light propagates through any non-ideal medium, the light experiences dispersion. The dispersion may have many contributing forms that add to the total dispersion, for example polarization mode dispersion or chromatic dispersion, but all forms of dispersion will result in a broadening of a pulse of light. Optical system designers must consider dispersion when designing an optical network. If the amount of dispersion experienced by an optical signal will exceed an acceptable level, then the dispersion will have to be compensated for in some way. Therefore, it is advantageous if the amount of dispersion present in an optical signal can be determined.

Some conventional dispersion compensation systems do not determine the dispersion per se, but instead utilize a bit error rate (BER) monitor that determines a BER by adjusting a tunable dispersion compensation module and monitoring what effect the tunable dispersion compensation module has on the BER. When the BER is minimized it is assumed that the dispersion has been ideally compensated for, and thus the dispersion is assumed to be equal to the dispersion compensation value that resulted in a minimum BER. However, such systems are dependent on the modulation format of the optical signal. For example, a non-return to zero (NRZ) optical signal with a dispersion of 100 ps may have the same BER as a return to zero (RZ) optical signal with a dispersion of 75 ps. Furthermore, these conventional systems assume that the BER and any change in the BER is due to dispersion and a change in dispersion respectively, whereas in reality the BER is a function of many other factors, including insertion losses and noise. In addition, determining a BER requires the demodulation and decoding of an optical signal, which greatly increases the complexity and cost of these dispersion determining systems.

SUMMARY OF THE INVENTION

According to one aspect of the present invention, there is provided a method comprising the steps of: for a combined optical signal comprising a first component and a second component delayed relative to one another by a delay time $\tau$, determining a power of the combined optical signal; applying each of a plurality of dispersion compensation values such that dispersion of at least one of: a) the first component of the combined optical signal; and b) the second component of the combined optical signal, is affected by each dispersion compensation value; and determining a dispersion compensation value of the plurality of dispersion compensation values that results in a minimum detected power of the combined optical signal.

In some embodiments, the method further comprises determining that dispersion of a first optical signal is substantially equal to the dispersion compensation value of the plurality of dispersion compensation values that results in the minimum detected power of the combined optical signal, wherein: applying each of a plurality of dispersion compensation values comprises applying each of the plurality of dispersion compensation values to the first optical signal to generate an at least partially dispersion compensated first optical signal; and wherein the combined optical signal comprising the first component and the second component is generated by: splitting the at least partially dispersion compensated first optical signal into a third component and a fourth component; introducing the relative delay time $\tau$ between the third component and the fourth component; and combining the relatively delayed third and fourth components to generate the combined optical signal comprising the first component and the second component.

In some embodiments, the method further comprises determining that dispersion of a first optical signal is substantially equal to the dispersion compensation value of the plurality of dispersion compensation values that results in the minimum detected power of the combined optical signal, wherein: the combined optical signal comprising the first component and the second component is generated by: splitting the first optical signal into a third component and a fourth component, wherein applying each of a plurality of dispersion compensation values comprises applying each of the plurality of dispersion compensation values to the third component to generate an at least partially dispersion compensated third component; introducing the relative delay time $\tau$ between the at least partially dispersion compensated third component and the fourth component; and combining the relatively delayed at least partially dispersion compensated third component and the relatively delayed fourth component to generate the combined optical signal comprising the first component and the second component.

In some embodiments, the method further comprises determining that dispersion of a first optical signal is substantially equal to the dispersion compensation value of the plurality of dispersion compensation values that results in the minimum detected power of the combined optical signal, wherein: applying each of a plurality of dispersion compensation values comprises applying each of the plurality of dispersion compensation values to another combined optical signal to generate the combined optical signal comprising the first component and the second component; and wherein the another combined optical signal is generated by: splitting the first optical signal into a third component and a fourth component; introducing the relative delay time $\tau$ between the third component and the fourth component; and combining the relatively delayed third and fourth components to generate the another combined optical signal.

In some embodiments, the method further comprises a step of: selecting a channel wavelength signal from a first wavelength division multiplexed optical signal comprising a plurality of channel wavelength signals, wherein the first optical signal comprises the channel wavelength signal.

In some embodiments, the steps of the method are repeated for each channel wavelength signal of the plurality of channel wavelength signals of the first wavelength division multiplexed optical signal.

In some embodiments, the step of selecting a channel wavelength signal from a first wavelength division multiplexed optical signal comprising a plurality of channel wavelength signals comprises: selectively filtering the first wavelength division multiplexed optical signal to pass only the channel wavelength signal.

In some embodiments, the method further comprises a step of: tapping a second wavelength division multiplexed optical signal to generate the first wavelength division multiplexed optical signal.

In some embodiments, the method further comprises a step of: tapping a second optical signal to generate the first optical signal.

In some embodiments, the step of determining power of the combined optical signal comprises squaring and integrating the electric field of the combined optical signal.

In some embodiments, the delay time $\tau$ is bit-rate dependent.

According to another aspect of the present invention, there is provided a system comprising: a power detector that detects power of a combined optical signal comprising a first component and a second component; a tunable dispersion compensation module (TDCM) that applies each of a plurality of dispersion compensation values such that dispersion of at least one of: a) the first component of the combined optical signal; and b) the second component of the combined optical signal, is affected by each dispersion compensation value; and a controller that controls the TDCM and determines a dispersion compensation value of the plurality of dispersion compensation values that results in a minimum detected power of the combined optical signal.

In some embodiments, the system further comprises a splitter-delayer-combiner, wherein: the controller also determines that dispersion of a first optical signal is substantially equal to the dispersion compensation value of the plurality of dispersion compensation values that results in the minimum detected power of the combined optical signal; the TDCM applies each of the plurality of dispersion compensation values to the first optical signal to generate an at least partially dispersion compensated first optical signal; and the combined optical signal comprising the first component and the second component is generated by the splitter-delayer-combiner that: splits the at least partially dispersion compensated first optical signal into a third component and a fourth component; introduces a relative delay time $\tau$ between the third component and the fourth component; and combines the relatively delayed third and fourth components to generate the combined optical signal comprising the first component and the second component.

In some embodiments, the system further comprises a splitter-delayer-combiner, wherein: the controller also determines that dispersion of a first optical signal is substantially equal to the dispersion compensation value of the plurality of dispersion compensation values that results in the minimum detected power of the combined optical signal; and the combined optical signal comprising the first component and the second component is generated by the splitter-delayer-combiner that: splits the first optical signal into a third component and a fourth component, wherein the TDCM applies each of the plurality of dispersion compensation values to the third component to generate an at least partially dispersion compensated third component; introduces a relative delay time $\tau$ between the at least partially dispersion compensated third component and the fourth component; and combines the relatively delayed at least partially dispersion compensated third component and the relatively delayed fourth component to generate the combined optical signal comprising the first component and the second component.

In some embodiments, the system further comprises a splitter-delayer-combiner, wherein: the controller also determines that dispersion of a first optical signal is substantially equal to the dispersion compensation value of the plurality of dispersion compensation values that results in the minimum detected power of the combined optical signal; the TDCM applies each of the plurality of dispersion compensation values to another combined optical signal to generate the combined optical signal comprising the first component and the second component; and wherein the another combined optical signal is generated by the splitter-delayer-combiner that: splits the first optical signal into a third component and a fourth component; introduces a relative delay time $\tau$ between the third component and the fourth component; and combines the relatively delayed third and fourth components to generate the another combined optical signal.

In some embodiments, the system further comprises an optical tap that taps a second optical signal to generate the first optical signal.

In some embodiments, the system further comprises: a channel-wavelength selector that selects a channel wavelength of a first wavelength division multiplexed optical signal comprising a plurality of channel wavelengths to generate the first optical signal, wherein the controller controls the channel-wavelength selector to select the channel wavelength from the plurality of channel wavelengths to generate the first optical signal.

In some embodiments, the channel-wavelength selector comprises a tunable filter that selects the channel wavelength by filtering the other channel wavelengths of the plurality of channel wavelengths.

In some embodiments, the system further comprises an optical tap that taps a second WDM optical signal to generate the first WDM optical signal.

In some embodiments, the splitter-delayer-combiner comprises: a four-port optical coupler having a first port, a second port, a third port and a fourth port, that: splits the at least partially dispersion compensated first optical signal into the third component and the fourth component; passes the third component and the fourth component to its third port and its fourth port respectively; receives the relatively delayed third component at one of its third port and its fourth port; receives the relatively delayed fourth component at the other one of its third port and its fourth port; combines the relatively delayed third component and the relatively delayed fourth component to generate the combined optical signal comprising the first component and the second component; and passes the combined optical signal comprising the first component and the second component to its second port; and an optical isolator that: allows the first optical signal to propagate in a first direction to reach the first port of the four-port optical coupler; and prevents an optical signal from the first port of the four-port optical coupler from propagating in a second direction opposite to the first direction.

In some embodiments, the splitter-delayer-combiner comprises: a four-port optical coupler having a first port, a second port, a third port and a fourth port, that: splits the first optical signal into the third component and the fourth component; passes the third component and the fourth component to its third port and its fourth port respectively; receives the relatively delayed at least partially dispersion compensated third component at one of its third port and its fourth port; receives the relatively delayed fourth component at the other one of its third port and its fourth port; combines the relatively delayed at least partially dispersion compensated third component and the relatively delayed fourth component to generate the combined optical signal comprising the first component and the second component; and passes the combined optical signal comprising the first component and the second component to its second port; and an optical isolator that: allows the first optical signal to propagate in a first direction to reach the first port of the four-port optical coupler; and prevents an optical signal from the first port of the four-port optical coupler from propagating in a second direction opposite to the first direction.

In some embodiments, the splitter-delayer-combiner comprises: a four-port optical coupler having a first port, a second port, a third port and a fourth port, that: splits the first optical signal into the third component and the fourth component; passes the third component and the fourth component to its third port and its fourth port respectively; receives the relatively delayed third component at one of its third port and its fourth port; receives the relatively delayed fourth component at the other one of its third port and its fourth port; combines the relatively delayed third component and the relatively delayed fourth component to generate the another combined optical signal comprising the first component and the second component; and passes the combined optical signal comprising the first component and the second component to its second port; and an optical isolator that: allows the first optical signal to propagate in a first direction to reach the first port of the four-port optical coupler; and prevents an optical signal from the first port of the four-port optical coupler from propagating in a second direction opposite to the first direction.

In some embodiments, the splitter-delayer-combiner further comprises: a circulator having a first port, a second port, and a third port, that: receives the third component from the third port of the four-port optical coupler on its first port; receives the fourth component from the fourth port of the four-port optical coupler on its third port; and passes the third component to its second port and pass the fourth component to its first port, wherein the TDCM applies each of the plurality of dispersion compensation values to the third component from the second port of the circulator to generate the at least partially dispersion compensated third component; a delay element that introduces the relative delay time τ between the at least partially dispersion compensated third component and the fourth component; and a mirror that substantially reflects all of the relatively delayed at least partially dispersion compensated third component back to the second port of the circulator; the circulator passes the relatively delayed at least partially dispersion compensated third component received on its second port to its third port, wherein the four-port optical coupler: receives the relatively delayed at least partially dispersion compensated third component from the third port of the circulator on its fourth port; and receives the relatively delayed fourth component from the first port of the circulator on its third port.

In some embodiments, the four-port optical coupler comprises a 3-dB fiber coupler.

In some embodiments, the splitter-delayer-combiner comprises: a delay element that introduces the relative delay time τ between the third component from the third port of the four-port optical coupler and the fourth component from the fourth port of the four-port optical coupler; a first mirror; a second mirror that substantially reflects all of the fourth component from the fourth port of the four-port optical coupler back to the fourth port of the four-port optical coupler as the relatively delayed fourth component, wherein the TDCM applies each of the plurality of dispersion compensation values to the relatively delayed third component from the delay element to generate the relatively delayed at least partially dispersion compensated third component; and the first mirror substantially reflects all of the relatively delayed at least partially dispersion compensated third component back to the third port of the four-port optical coupler.

In some embodiments, the splitter-delayer-combiner comprises a Mach-Zehnder interferometer.

In some embodiments, the Mach-Zehnder interferometer comprises: a splitter that splits the at least partially dispersion compensated first optical signal into the third component and the fourth component along a first signal path and a second signal path, respectively; a delay element in one of the first signal path and the second signal path that introduce the relative delay time τ between the third component and the fourth component; and a combiner that combines the relatively delayed third component and the relatively delayed fourth component to generate the combined optical signal comprising the first component and the second component.

In some embodiments, the Mach-Zehnder interferometer comprises: a splitter that splits the first optical signal into the third component and the fourth component along a first signal path and a second signal path, respectively; a delay element in one of the first signal path and the second signal path that introduces the relative delay time τ between the at least partially dispersion compensated third component and the fourth component; and a combiner that combines the relatively delayed at least partially dispersion compensated third component and the relatively delayed fourth component to generate the combined optical signal comprising the first component and the second component.

In some embodiments, the Mach-Zehnder interferometer comprises: a splitter that splits the first optical signal into the third component and the fourth component along a first signal path and a second signal path, respectively; a delay element in one of the first signal path and the second signal path that introduces the relative delay time τ between the third component and the fourth component; and a combiner that combines the relatively delayed third component and the relatively delayed fourth component to generate the another combined optical signal.

In some embodiments, the system further comprises a square law power detector that determines the power of the combined optical signal.

In some embodiments, the Mach-Zehnder interferometer comprises: a polarization beam splitter that splits the at least partially dispersion compensated first optical signal into the third component and the fourth component along a first signal path and a second signal path, respectively, wherein the third component and the fourth component comprise a third polarization component and a fourth polarization component, respectively; a variable delay element with a variable time delay $\tau_{var}$ in one of the first signal path and the second signal path that introduces the relative delay time τ between the third component and the fourth component; and a polarization beam combiner that combines the relatively delayed third component and the relatively delayed fourth component to generate the combined optical signal comprising the first component and the second component, wherein the first component and the second component comprise a first polarization component and a second polarization component, respectively, wherein the controller determines an amount of polarization mode dispersion time delay $\tau_{pmd}$ in the first optical signal by: setting the variable time delay $\tau_{var}$ to a plurality of different values; applying the plurality of dispersion compensation values for each value of the variable time delay $\tau_{var}$; determining a variable time delay value $\tau_{var}$ of the plurality of variable time delay values for which the detected power of the combined optical signal is substantially equal for each of the plurality of dispersion compensation values; determining that the amount of polarization mode dispersion time delay $\tau_{pmd}$ in the first optical signal is equal to the variable time delay value $\tau_{var}$ for which the detected power of the combined optical signal is substantially equal for each of the plurality of dispersion compensation values; and setting the variable time delay element such that $\tau_{var} = \tau_{pmd} + \tau$, wherein the relative time delay τ is introduced between the first component and the second component of the combined optical signal.

In some embodiments, the Mach-Zehnder interferometer comprises: a polarization beam splitter that splits the first optical signal into the third component and the fourth component along a first signal path and a second signal path, respectively, wherein the third component and the fourth component comprise a third polarization component and a fourth polarization component, respectively; a variable delay element with a variable time delay $\tau_{var}$ in one of the first signal path and the second signal path that introduces the relative delay time $\tau$ between the at least partially dispersion compensated third component and the fourth component; and a combiner that combines the relatively delayed at least partially dispersion compensated third component and the relatively delayed fourth component to generate the combined optical signal comprising the first component and the second component, wherein the first component comprises a first polarization component and the second component comprises a second polarization component, wherein the controller determines an amount of polarization mode dispersion time delay $\tau_{pmd}$ in the first optical signal by: setting the variable time delay $\tau_{var}$ to a plurality of different values; applying the plurality of dispersion compensation values for each value of the variable time delay $\tau_{var}$; determining a variable time delay value $\tau_{var}$ of the plurality of variable time delay values for which the detected power of the combined optical signal is substantially equal for each of the plurality of dispersion compensation values; determining that the amount of polarization mode dispersion time delay $\tau_{pmd}$ in the first optical signal is equal to the variable time delay value $\tau_{var}$ for which the detected power of the combined optical signal is substantially equal for each of the plurality of dispersion compensation values; and setting the variable time delay element such that $\tau_{var} = \tau_{pmd} + \tau$, wherein the relative time delay $\tau$ is introduced between the first component and the second component of the combined optical signal.

In some embodiments, the Mach-Zehnder interferometer comprises: a polarization beam splitter that splits the first optical signal into the third component and the fourth component along a first signal path and a second signal path, respectively, wherein the third component and the fourth component comprise a third polarization component and a fourth polarization component, respectively; a variable delay element with a variable time delay $\tau_{var}$ in one of the first signal path and the second signal path that introduces the relative delay time $\tau$ between the third component and the fourth component; and a polarization beam combiner that combines the relatively delayed third component and the relatively delayed fourth component to generate the another combined optical signal, wherein the controller determines an amount of polarization mode dispersion time delay $\tau_{pmd}$ in the first optical signal by: setting the variable time delay $\tau_{var}$ to a plurality of different values; applying the plurality of dispersion compensation values for each value of the variable time delay $\tau_{var}$; determining a variable time delay value $\tau_{var}$ of the plurality of variable time delay values for which the detected power of the combined optical signal is substantially equal for each of the plurality of dispersion compensation values; determining that the amount of polarization mode dispersion time delay $\tau_{pmd}$ in the first optical signal is equal to the variable time delay value $\tau_{var}$ for which the detected power of the combined optical signal is substantially equal for each of the plurality of dispersion compensation values; and setting the variable time delay element such that $\tau_{var} = \tau_{pmd} + \tau$, wherein the relative time delay $\tau$ is introduced between the first component and the second component of the combined optical signal.

According to yet another aspect of the present invention, there is provided a method comprising the steps of: for a combined optical signal comprising a first polarization component and a second polarization component, introducing a relative variable delay time $\tau_{var}$ between the first polarization component and the second polarization component; determining a power of the combined optical signal; adjusting the relative variable delay time $\tau_{var}$ until the detected power of the combined optical signal is substantially equal for each of a plurality of dispersion compensation values when the plurality of dispersion compensation values are applied such that dispersion of at least one of: a) the first polarization component of the combined optical signal; and b) the second polarization component of the combined optical signal, is affected by each dispersion compensation value.

In some embodiments, the method further comprises determining that an amount of PMD (polarization mode dispersion) in a first optical signal resulting in a time delay $\tau_{pmd}$ between the first polarization component and the second polarization component of the combined optical signal is equal to the relative variable delay time $\tau_{var}$ for which the detected power of the combined optical signal is substantially equal for each of the plurality of dispersion compensation values, wherein: applying each of the plurality of dispersion compensation values comprises applying each of the plurality of dispersion compensation values to the first optical signal to generate an at least partially dispersion compensated first optical signal; and wherein the combined optical signal comprising the first polarization component and the second polarization component is generated by: splitting the at least partially dispersion compensated first optical signal into a third polarization component and a fourth polarization component; introducing the relative variable delay time $\tau_{var}$ between the third polarization component and the fourth polarization component; and combining the relatively delayed third and fourth polarization components to generate the combined optical signal comprising the first polarization component and the second polarization component.

In some embodiments, the method further comprises determining that an amount of PMD (polarization mode dispersion) in a first optical signal resulting in a time delay $\tau_{pmd}$ between the first polarization component and the second polarization component of the combined optical signal is equal to the relative variable delay time $\tau_{var}$ for which the detected power of the combined optical signal is substantially equal for each of the plurality of dispersion compensation values, wherein: the combined optical signal comprising the first polarization component and the second polarization component is generated by: splitting the first optical signal into a third polarization component and a fourth polarization component, wherein applying each of the plurality of dispersion compensation values comprises applying each of the plurality of dispersion compensation values to the third polarization component to generate an at least partially dispersion compensated third polarization component; introducing the relative variable delay time $\tau_{var}$ between the at least partially dispersion compensated third polarization component and the fourth polarization component; and combining the relatively delayed at least partially dispersion compensated third polarization component and the relatively delayed fourth polarization component to generate the combined optical signal comprising the first polarization component and the second polarization component.

In some embodiments, the method further comprises determining that an amount of PMD (polarization mode dispersion) in a first optical signal resulting in a time delay $\tau_{pmd}$ between the first polarization component and the second polarization component of the combined optical signal is equal to the relative variable delay time $\tau_{var}$ for which the detected power of the combined optical signal is substantially equal for each of the plurality of dispersion compensation values, wherein: applying each of the plurality of dispersion compensation values comprises applying each of the plurality of dispersion compensation values to another combined optical signal to generate the combined optical signal comprising the first polarization component and the second polarization component; and wherein the another combined optical signal is generated by: splitting the first optical signal into a third polarization component and a fourth polarization component; introducing the relative variable delay time $\tau_{var}$ between the third polarization component and the fourth polarization component; and combining the relatively delayed third and fourth polarization components to generate the another combined optical signal.

In some embodiments, the method further comprises a step of: selecting a channel wavelength signal from a first wavelength division multiplexed optical signal comprising a plurality of channel wavelength signals, wherein the first optical signal comprises the channel wavelength signal.

In some embodiments, the steps of the method are repeated for each channel wavelength signal of the plurality of channel wavelength signals of the first wavelength division multiplexed optical signal.

In some embodiments, the step of selecting a channel wavelength signal from a first wavelength division multiplexed optical signal comprising a plurality of channel wavelength signals comprises: selectively filtering the first wavelength division multiplexed optical signal to pass only the channel wavelength signal.

In some embodiments, the method further comprises a step of: tapping a second wavelength division multiplexed optical signal to generate the first wavelength division multiplexed optical signal.

In some embodiments, the method further comprises a step of: tapping a second optical signal to generate the first optical signal.

In some embodiments, the step of determining power of the combined optical signal comprises squaring and integrating the electric field of the combined optical signal.

In some embodiments, the method further comprises: introducing a relative delay time $\tau$ between the first polarization component and the second polarization component of the combined optical signal by setting the relative variable time delay $\tau_{var}=\tau_{pmd}+\tau$; applying the plurality of dispersion compensation values while $\tau_{var}=\tau_{pmd}+\tau$; determining that chromatic dispersion of the first optical signal is substantially equal to a dispersion compensation value of the plurality of dispersion compensation values that are applied while $\tau_{var}=\tau_{pmd}+\tau$ that results in a minimum detected power of the combined optical signal.

In some embodiments, the relative variable delay time $\tau$ is bit-rate dependent.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION

Various systems and methods for in-service determination of optical dispersion are provided. Embodiments of the present invention provide in-service dispersion determination of a wavelength division multiplex (WDM) optical signal without interrupting communication. Embodiments of the present invention are bit rate independent, polarization insensitive and are relatively inexpensive and simple to implement. Some embodiments of the present invention provide in-service dispersion determination of polarization mode dispersion and chromatic dispersion individually, so that the PMD and CD components of the total dispersion are determined.

Methods for determining dispersion of an optical signal in accordance with some embodiments of the present invention will now be described with reference to FIGS. 1A-1D.

Figure 1A:
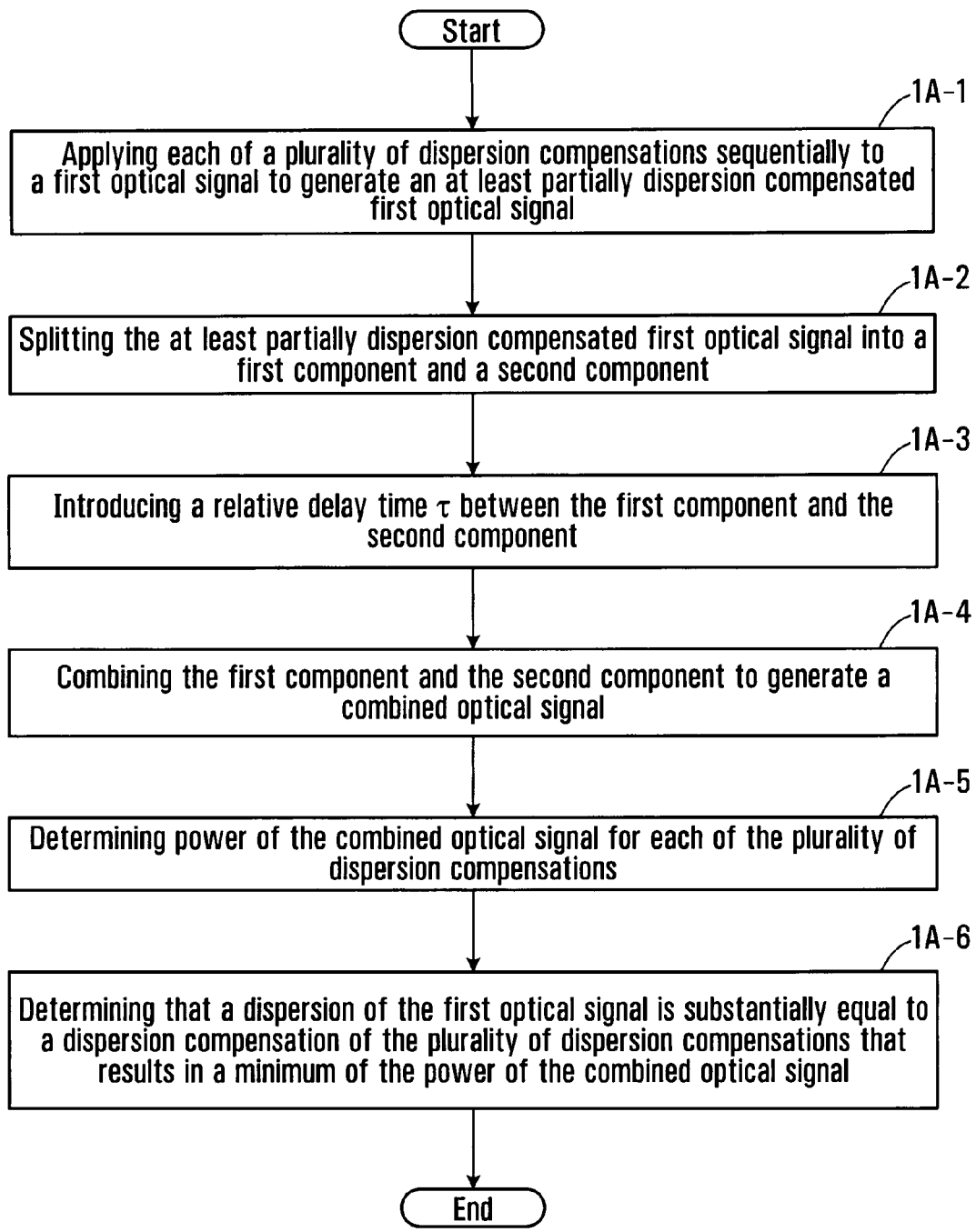
FIG. 1A is a flowchart of an example of a method for determining dispersion in accordance with an embodiment of the invention.

In FIG. 1A, the method begins at step 1A-1, in which each of a plurality of dispersion compensation values are sequentially applied to a first optical signal to generate an at least partially dispersion compensated first optical signal. Steps 1A-2 to 1A-5 described below are performed for each of the dispersion compensation values.

In some embodiments, the plurality of dispersion compensation values are applied by controlling a tunable dispersion compensation module (TDCM).

In step 1A-2, the at least partially dispersion compensated first optical signal is split into a first component and a second component.

In step 1A-3, a relative delay time $\tau$ is introduced between the first component and the second component. The relative delay time $\tau$ is selected such that corresponding optical pulses of the first component and the second component partially overlap.

In step 1A-4, the first component and the second component are combined to generate a combined optical signal comprising a third component and a fourth component with corresponding optical pulses that partially overlap.

In step 1A-5, a measure of power of the combined optical signal is determined. The power of the combined optical signal will depend in part on the power of the overlapping portions of the corresponding pulses of the third component and the fourth component of the combined optical signal, as described in greater detail later.

In some embodiments, determining power of the combined optical signal includes squaring and integrating the electric field of the combined optical signal by detecting the combined optical signal with a square law photodiode that's output current is proportional to the integral of the squared electric field of its optical input.

In step 1A-6, dispersion of the first optical signal is determined to be substantially equal to a dispersion compensation value of the plurality of dispersion compensation values that results in a minimum power of the combined optical signal.

Figure 3A:
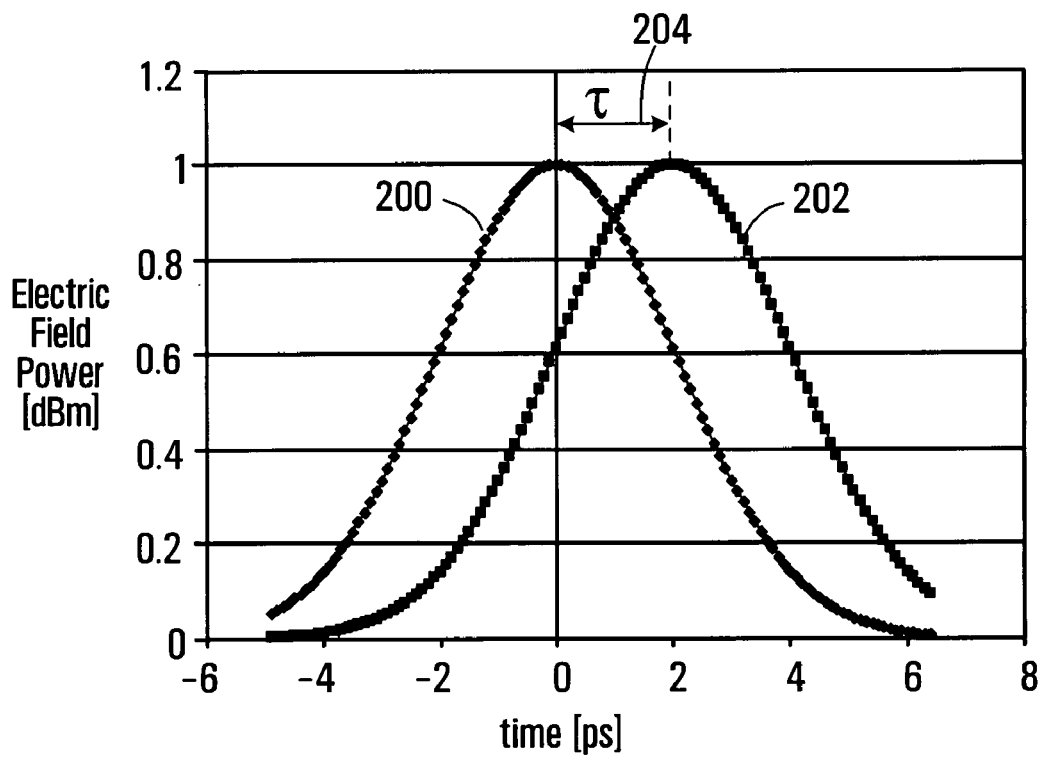
FIG. 3A is a plot of two pulses offset by the differential time delay of a Mach-Zehnder interferometer.

Introducing the relative delay time $\tau$ between the first component and the second component in step 1A-3 results in corresponding pulses in the first component and the second component being offset in time by $\tau$, as illustrated by the first pulse 200 and the second pulse 202 shown in FIG. 3A.

Applying each of the plurality of dispersion compensation values to the first optical signal in step 1A-1 means that both the first pulse 200 of the first component and the second pulse 202 of the second component will be narrowed or broadened as each dispersion compensation value is applied, depending on whether the applied dispersion compensation value cancels out at least a portion of the dispersion or adds to the dispersion.

As each of the plurality of dispersion compensation values are applied to the first optical signal, the corresponding pulses of the first component and the second component will narrow or broaden, such that they are most narrow when the dispersion in the first optical signal is optimally compensated for. As the corresponding pulses of the first component and the second component narrow, they will overlap less, and hence the power of the overlapping portions of the first and second components, and hence of the overlapping portions of the third component and the fourth component of the combined optical signal, will be at a minimum when the dispersion in the first optical signal is optimally compensated for, as shown in the power detector output 206 of FIG. 3B. Therefore, determining the dispersion compensation value that results in the power of the combined optical signal serves to determine the dispersion in the first optical signal.

In the method illustrated in the flowchart of FIG. 1A, the plurality of dispersion compensation values are applied directly to the first optical signal, which results in the dispersion of optical pulses of both the first component and the second component, and hence both the third component and the fourth component of the combined optical signal, being affected by each dispersion compensation value. However, in some embodiments, the plurality of dispersion compensation values are applied such that the dispersion of optical pulses of only one of the first component and the second component, and hence only one of the third component and the fourth component of the combined optical signal, are affected by each dispersion compensation value.

Figure 1B:
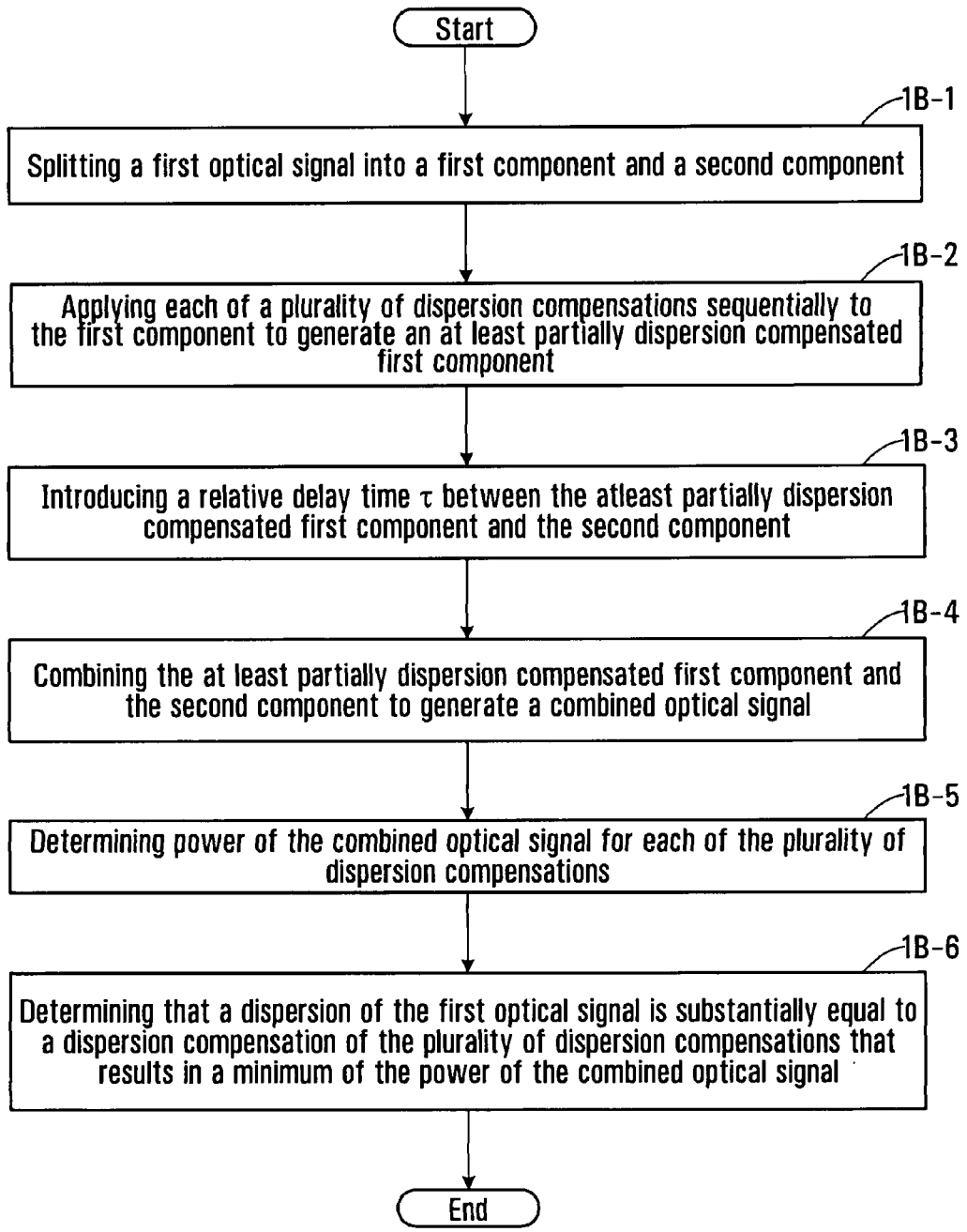
FIG. 1B is another flowchart of an example of a method for determining dispersion in accordance with an embodiment of the invention.

An example of a method in which the dispersion of only one of the first component and the second component is affected by each dispersion compensation value is illustrated in FIG. 1B.

In FIG. 1B, the method begins at step 1B-1, in which a first optical signal is split into a first component and a second component.

In step 1B-2 each of a plurality of dispersion compensation values are sequentially applied to the first component to generate an at least partially dispersion compensated first component. Steps 1B-3 to 1B-5 described below are performed for each of the dispersion compensation values.

In step 1B-3, a relative delay time $\tau$ is introduced between the at least partially dispersion compensated first component and the second component. The relative delay time $\tau$ is selected such that corresponding optical pulses of the at least partially dispersion compensated first component and the second component partially overlap.

In step 1B-4, the at least partially dispersion compensated first component and the second component are combined to generate a combined optical comprising a third component and a fourth component with corresponding optical pulses that partially overlap.

In step 1B-5, power of the combined optical signal is determined.

In step 1B-6, dispersion of the first optical signal is determined to be substantially equal to a dispersion compensation value of the plurality of dispersion compensation values that results in a minimum power of the combined optical signal.

In the method illustrated in the flowchart of FIG. 1B, the plurality of dispersion compensation values are applied to the first component after the first optical signal is split into the first component and the second component, but the method is otherwise identical to the method illustrated in the flowchart of FIG. 1A.

In operation, applying the plurality of dispersion compensation values to only one of the first component and the second component, in this case only the first component, means that only the pulses of one of the first component and the second component will be affected by each dispersion compensation value. For example, only one of the pulses 200,202 in FIG. 3A would be affected by each dispersion compensation value. In this case, when the plurality of dispersion compensation values are applied only to the first component, only the first pulse 200 will be affected by a given dispersion compensation value, while the second pulse 202 of the second component will be unaffected. However, the broadening or narrowing of the first pulse 200 will still alter the amount of overlap between the first pulse 200 and the second pulse 202. Therefore, once the first component and the second component are combined to generate the combined optical signal, the measure of the power of overlapping portions of the third component and the fourth component of the combined optical signal will still have a minimum value when a dispersion compensation value effectively cancels the dispersion of the first optical signal.

In some embodiments, the at least partially dispersion compensated first component is delayed relative to the second component by the predetermined delay time $\tau$.

In some embodiments, the second component is delayed relative to the at least partially dispersion compensated first component by the predetermined delay time $\tau$.

In some embodiments, both the at least partially dispersion compensated first component and the second component are delayed, but one is additionally delayed relative to the other by the predetermined delay time $\tau$.

In some embodiments, the plurality of dispersion compensation values are applied to the second component to generate an at least partially dispersion compensated second component, rather than applying the plurality of dispersion compensation values to the first component to generate the at least partially dispersion compensated first component.

In some embodiments, the plurality of dispersion compensation values are applied to the second component and the at least partially dispersion compensated second component is delayed relative to the first component by the predetermined delay time τ.

In some embodiments, the relative delay time τ is introduced between the first component and the second component before the plurality of dispersion compensation values are applied.

In some embodiments, the plurality of dispersion compensation values are applied to the first component and the second component.

Figure 1C:
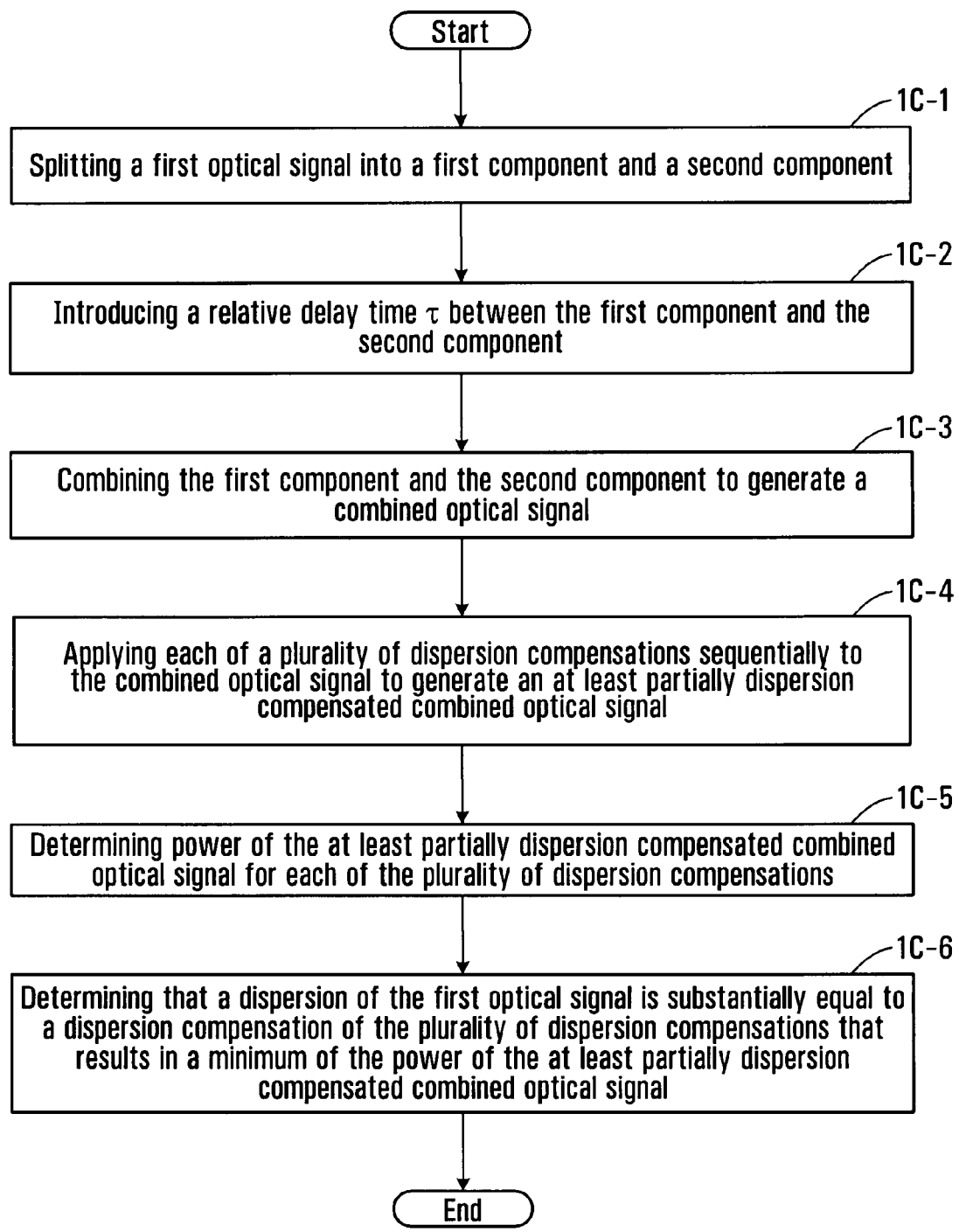
FIG. 1C is yet another flowchart of an example of a method for determining dispersion in accordance with an embodiment of the invention.

Another example of a method of determining a dispersion of a first optical signal is illustrated in the flowchart of FIG. 1C.

In FIG. 1C, the method begins at step 1C-1, in which a first optical signal is split into a first component and a second component.

In step 1C-2, a relative delay time τ is introduced between the first component and the second component. The relative delay time τ is selected such that corresponding optical pulses of the first component and the second component partially overlap.

In step 1C-3, the first component and the second component are combined to generate a combined optical signal.

In step 1C-4 each of a plurality of dispersion compensation values are sequentially applied to the combined optical signal to generate an at least partially dispersion compensated combined optical signal. Step 1C-5 described below is performed for each of the dispersion compensation values.

In step 1C-5, power of the at least partially dispersion compensated combined optical signal is determined.

In step 1C-6, dispersion of the first optical signal is determined to be substantially equal to a dispersion compensation value of the plurality of dispersion compensation values that results in a minimum power of the at least partially dispersion compensated combined optical signal.

The method illustrated in the flowchart of FIG. 1C is similar to the method illustrated in the flowchart of FIG. 1A, except that rather than applying the plurality of dispersion compensation values before the first optical signal is split into the first component and the second component, as in FIG. 1A, in FIG. 1C, the plurality of dispersion compensation values are applied after the first component and the second component are recombined to generate the combined optical signal. However, as with the method illustrated in the flowchart of FIG. 1A, in the method illustrated in the flowchart of FIG. 1C, the third component and the fourth component are affected by each of the plurality of dispersion compensation values.

In some embodiments, a polarization mode dispersion of the first optical signal is determined in addition to the chromatic dispersion of the first optical signal. An example of a method in which the polarization mode dispersion and the chromatic dispersion of an optical signal are determined is illustrated in FIG. 1D.

Figure 1D:
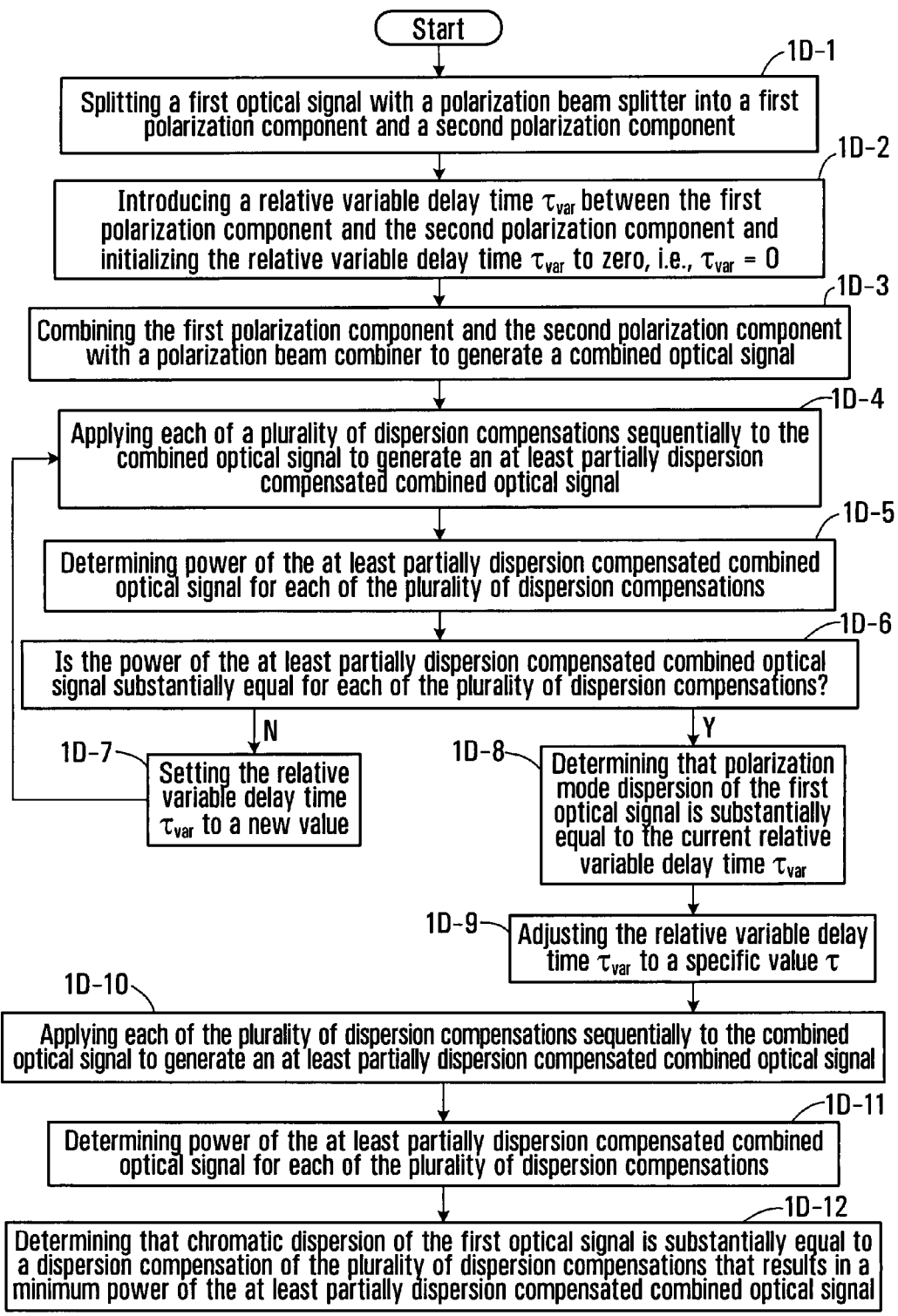
FIG. 1D is a flowchart of an example of a method for individually determining polarization mode dispersion and chromatic dispersion in accordance with an embodiment of the invention.

In FIG. 1D, the method begins at step 1D-1, in which a first optical signal is split into a first polarization component and a second polarization component with a polarization beam splitter, or any other component that is capable of splitting an optical signal into two polarization components.

In step 1D-2, a variable delay time $\tau_{VAR}$ is introduced between the first polarization component and the second polarization component. The variable delay time $\tau_{VAR}$ is initially set to zero delay, i.e. $\tau_{VAR}=0$.

In step 1D-3, the first polarization component and the second polarization component are combined with a polarization beam combiner to generate a combined optical signal. In general, any component capable of combining a first polarization component and a second polarization component may be used as a polarization beam combiner.

In step 1D-4, each of a plurality of dispersion compensation values are sequentially applied to the combined optical signal to generate an at least partially dispersion compensated combined optical signal. Step 1D-5 described below is performed for each of the dispersion compensation values.

In step 1D-5, a power of the at least partially dispersion compensated combined optical signal is determined for each of the plurality of dispersion compensation values.

In step 1D-6, if the power of the at least partially dispersion compensated combined optical signal is substantially equal for each of the plurality of dispersion compensation values, then the method proceeds to step 1D-8 (the yes path). Otherwise, the method proceeds to step 1D-7 (the no path).

By initializing the variable delay time $\tau_{VAR}$ to be zero, i.e., no additional delay between the first polarization component and the second polarization component, any offset between the first polarization component and the second polarization component can be assumed to be the result of polarization mode dispersion in the first optical signal. Therefore, if there is no PMD present in the first optical signal, there will be no offset between the first polarization component and the second polarization component when the variable delay time $\tau_{VAR}=0$.

Accordingly, if the variable delay time $\tau_{VAR}=0$ and there is not PMD present in the first optical signal, the first polarization component and the second polarization component will not be offset and applying the plurality of dispersion compensations to the combined optical signal will not substantially change the power of the at least partially dispersion compensated combined optical signal.

Alternatively, if there is PMD present in the first optical signal and/or the variable delay variable delay time $\tau_{VAR}\neq0$, i.e. the first polarization component and the second polarization component are offset and the offset causes a partial overlap of corresponding pulses of the first polarization component and the second polarization component, then applying the plurality of dispersion compensations to the combined optical signal will result in a minimum in the power of the at least partially dispersion compensated combined optical signal for the dispersion compensation that substantially compensates for the chromatic dispersion in the first optical signal.

In step 1D-7, the relative variable time delay $\tau_{VAR}$ is set to a new value and the method returns to step 1D-4. Steps 1D-4 to 1D-6 are then repeated for the new value of the relative variable time delay $\tau_{VAR}$.

In step 1D-8, the polarization mode dispersion of the first optical signal is determined to be substantially equal to the current relative variable delay time $\tau_{VAR}$. That is, the offset $\tau_{PMD}$ that is caused by the polarization mode dispersion is determined to be equal to the current relative variable delay time $\tau_{VAR}$, i.e., $\tau_{PMD}=\tau_{VAR}$.

In step 1D-9, the relative variable delay time $\tau_{VAR}$ is adjusted by a specific value τ such that the pulses of the first polarization component and the second polarization component are offset by τ. In step 1D-8 it was determined that a relative variable time delay $\tau_{VAR}=\tau_{PMD}$ causes the first polarization component and the second polarization component to be substantially aligned. Therefore, setting the relative variable time delay $\tau_{VAR}=\tau_{PMD}\pm\tau$ will offset the first polarization component and the second polarization component by the specific value τ.

In step 1D-10, each of the plurality of dispersion compensation values are sequentially applied to the combined optical signal to generate an at least partially dispersion compensated combined optical signal. Step 1D-11 described below is performed for each of the dispersion compensation values.

In step 1D-11, power of the at least partially dispersion compensated combined optical signal is determined.

In step 1D-12, chromatic dispersion of the first optical signal is determined to be substantially equal to a dispersion compensation value of the plurality of dispersion compensation values that results in a minimum detected power of the at least partially dispersion compensated combined optical signal.

The method illustrated in FIG. 1D is similar to the method illustrated in FIG. 1C in that the plurality of dispersion compensation values are applied to the combined optical signal. More generally, the plurality of dispersion compensations may be applied to at least one of: the first optical signal; the first polarization component; the second polarization component; and the combined optical signal.

In some embodiments, the plurality of dispersion compensation values are applied to the first optical signal before the first optical signal is split into the first polarization component and the second polarization component with the polarization beam splitter. In some embodiments, the plurality of dispersion compensation values are applied to at least one of the first polarization component and the second polarization component, before or after the relative variable delay time $\tau_{VAR}$ is introduced between the first polarization component and the second polarization component.

In the embodiment illustrated in FIG. 1D, both the CD and the PMD of the first optical signal are determined. In some embodiments, only the PMD is determined. In these embodiments, steps 1D-9 to 1D-12 can be omitted. Effectively, the relative variable delay time $\tau_{VAR}$ is adjusted until the PMD is substantially compensated for, i.e., the first polarization component and the second polarization component are substantially aligned and the power of the at least partially dispersion compensated combined optical signal is substantially equal for each of the plurality of dispersion compensations.

In some embodiments, the adjustment of the relative delay time $\tau_{VAR}$ to determine PMD is done by a first variable delay element, while the adjustment of the relative delay time $\tau_{VAR}$ to set the offset between the first polarization component and the second polarization component equal to a specific value $\tau$ to determine the chromatic dispersion is done by a second delay element once the PMD has been substantially compensated for by the first variable delay element.

In some embodiments, the second delay element is a second variable delay element.

In some embodiments, the delay time $\tau$ is bit-rate dependent.

The method steps shown in FIGS. 1A-1D are merely exemplary. In some embodiments, one or more method steps may be added, removed or re-ordered. For example, in some embodiments, the method further comprises tapping a second optical signal to generate the first optical signal.

In some embodiments, the first optical signal is a channel wavelength signal selected from a wavelength division multiplex (WDM) optical signal that includes a plurality of channel wavelength signals, and the method further comprises a step of selecting a channel wavelength signal as the first optical signal from the WDM optical signal.

In some embodiments, selecting the channel wavelength signal as the first optical signal from the WDM optical signal is done by selectively filtering the WDM optical signal with a tunable filter.

In some embodiments, the step of selecting the channel wavelength signal as the first optical signal from the WDM optical signal and the method steps 1A-1 to 1A-6, 1B-1 to 1B-6 or 1C-1 to 1C-6 are repeated for each of the channel wavelengths of the WDM optical signal, thus determining the dispersion for each channel wavelength.

In-service dispersion determining systems in accordance with embodiments of the present invention will now be discussed with reference to FIGS. 2A, 2B and 2C.

Figure 2A:
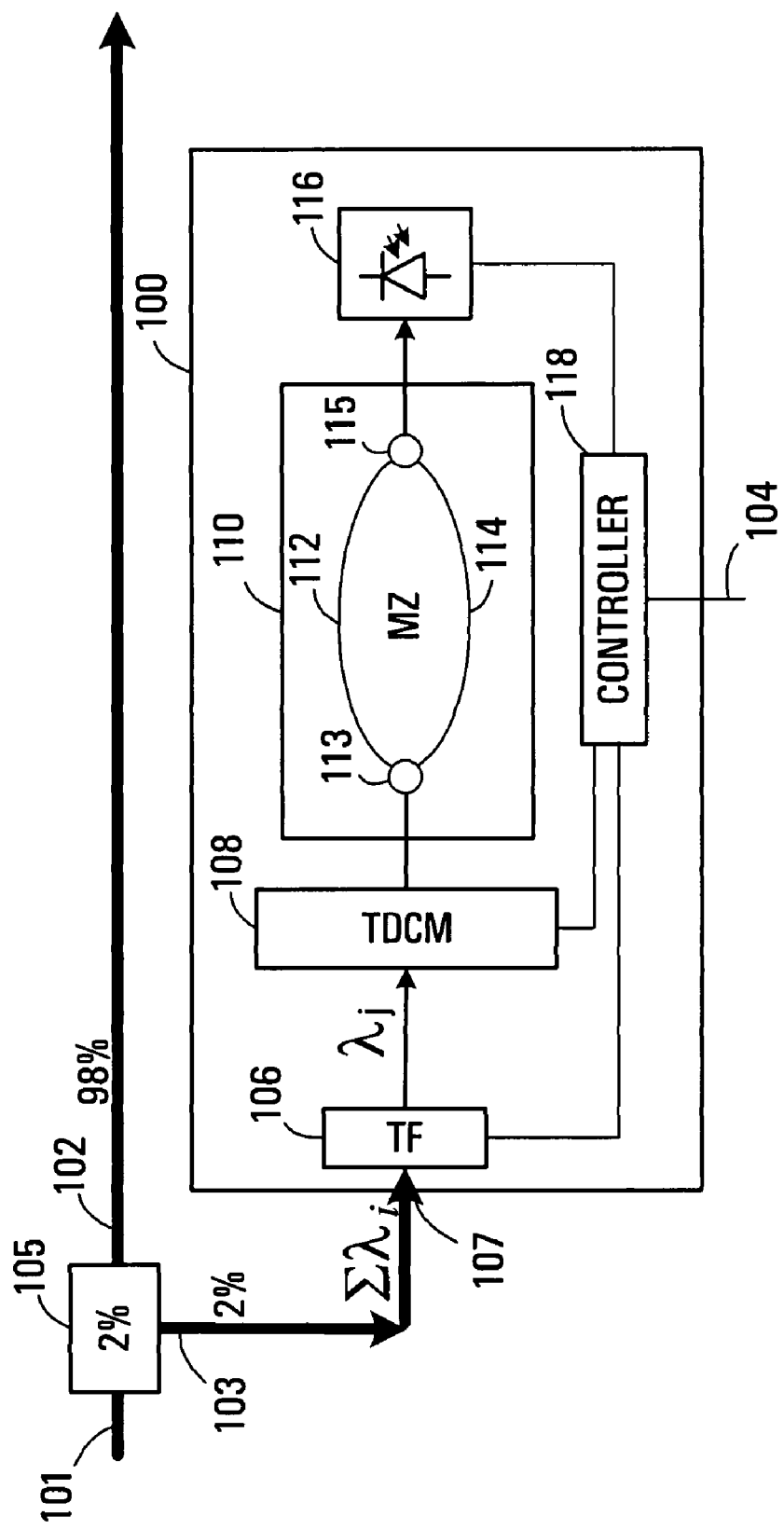
FIG. 2A is a block diagram of a dispersion determining system in accordance with an embodiment of the invention.

FIG. 2A is a block diagram of an in-service dispersion determining system 100 and an optical tap 105 arranged in accordance with an embodiment of the present invention.

In some embodiments, the optical tap 105 is included as part of the in-service dispersion determining system 100.

In FIG. 2A, the optical tap 105 is a 2% optical tap with an input 101, a first output 102 and a second output 103. The second output of the optical tap 105 is functionally connected to an input 107 of the in-service dispersion determining system 100.

The in-service dispersion determining system 100 includes a tunable filter 106, a TDCM (Tunable Dispersion Compensation Module) 108, a splitter-delayer-combiner 110, a photodetector 116 and a controller 118. The splitter-delayer-combiner 110 is implemented as a Mach-Zehnder interferometer in FIG. 2A. More generally, the splitter-delayer-combiner may be implemented by any device or arrangement of devices operable to:

a) split an optical signal into a first component and a second component;

b) introduce a relative delay time $\tau$ between the first component and the second component; and c) combine the first component and the second component once the relative delay time $\tau$ has been introduced to generate a combined optical signal.

The tunable filter 106 has an input functionally connected to the input 107, an output functionally connected to an input of the TDCM 108 and a control input functionally connected to a first control output of the controller 118.

The TDCM 108 has an output connected to the splitter-delayer-combiner 110, and a control input functionally connected to a second control output of the controller 118.

As stated above, the splitter-delayer-combiner 110 is implemented as a Mach-Zehnder interferometer, which includes a splitter 113, a first signal path 112, a second signal path 114 and a combiner 115. The splitter 113 has an input functionally connected to the input of the Mach-Zehnder interferometer, and a first output and a second output functionally connected to a start of the first signal path 112 and a start of the second signal path 114 respectively. The combiner 115 has a first input and a second input functionally connected to an end of the first signal path 112 and an end of the second signal path 114 respectively. The combiner 115 has an output that is functionally connected to an input of the photodetector 116.

The photodetector 116 has an output that is functionally connected to an input of the controller 118.

In some embodiments, the in-service dispersion determining system 100 also has a control port 104 that is functionally connected to a control port of the controller 118. The control port 104 may be used to externally control the operation of the controller 118 and/or to report determined dispersions to other network components, databases and/or user displays.

In operation, the optical tap 105 receives an optical signal at its input 101, passes a majority of the optical signal to its first output 102 and taps a small portion of the optical signal to its second output 103. The amount of the optical signal that is passed to the first output and the amount of the optical signal that is tapped to the second output is determined by the tap-ratio of the optical tap 105. In FIG. 2A, the optical tap is a 98/2 optical tap, so 98% of the optical signal is passed to the first output 102 and 2% of the optical signal is tapped to the second output 103.

In some embodiments, the optical tap 105 has a different tap ratio, for example, 95/5 or 90/10.

In FIG. 2A, the optical signal received at the input 101 of the optical tap 105 is assumed to be a dense wavelength division multiplexed (DWDM) optical signal that includes a plurality of channel wavelengths $\lambda_i$, so the portion of the optical signal tapped off to the input of the in-service dispersion determining system can be expressed as a summation of the channel wavelengths $\Sigma\lambda_i$.

The operation of the in-service dispersion determining system 100 can be controlled externally via the control input 104.

The tunable filter 106 is controlled by the controller 104 via the control input of the tunable filter 106. When the dispersion of a channel wavelength $\lambda_j$ is to be determined, the controller 104 controls the tunable filter 106 to select the channel wavelength $\lambda_j$ from the summation of channel wavelengths $\Sigma\lambda_i$ received at the input 107. The tunable filter 106 filters out all of the other channel wavelengths and passes the channel wavelength $\lambda_j$ signal to the TDCM 108.

Under control of the controller 118, the TDCM applies a dispersion compensation to the channel wavelength $\lambda_j$ signal and passes the dispersion-compensated channel wavelength $\lambda_j$ signal to the Mach-Zehnder interferometer of the splitter-delayer-combiner 110.

Assuming that the electric field of the selected channel wavelength $\lambda_j$ signal can be expressed as $$E_j = P(t, D_{GD})\mathrm{Sin}(2\pi F_j t) \quad (1)$$

where t is time, $D_{GD}$ is dispersion due to group delay, $F_j$ is the center frequency of the channel wavelength $\lambda_j$ signal and P( ) is the function that describes a pulse shape of the selected channel wavelength $\lambda_j$ signal as a function of time t and dispersion, the electric field of the optical output of the TDCM 108 can be expressed as $$E_j = P(t, D_{GD} - D_{CM})\mathrm{Sin}(2\pi F_j t) \quad (2)$$

where $D_{CM}$ is the dispersion compensation introduced by the TDCM.

The splitter 113 of the Mach-Zehnder interferometer splits the dispersion-compensated channel wavelength $\lambda_j$ signal into a first component along the first signal path 112 and into a second component along the second signal path 114. The first signal path 112 and the second signal path 114 introduce a relative delay $\tau$ between the first component and the second component.

In some embodiments, the splitter 113 splits the dispersion-compensated channel wavelength $\lambda_j$ signal equally into the first component and the second component.

In some embodiments, the splitter 113 is a 3-dB splitter.

In some embodiments, the relative delay $\tau$ is introduced by making one of the signal paths 112,114 longer than the other.

In some embodiments, one of the signal paths 112,114 includes a delay element that introduces the relative time delay $\tau$.

FIG. 3A illustrates the relative delay $\tau$ 204 introduced between corresponding pulses 200,202 of the first component and the second component by the first signal path and the second signal path respectively.

The relatively delayed first component and second component are combined by the combiner 115 to generate a combined optical signal comprising a third component and a fourth component with corresponding optical pulses that partially overlap, which is passed to the input of the photodetector 116.

Assuming that the splitter 113 is a 3-dB splitter, the electric field of the combined optical signal output of the Mach-Zehnder interferometer of the splitter-delayer-combiner 110 can be expressed as $$E_j = \frac{1}{\sqrt{2}} P(t, D_{GD} - D_{CM})\mathrm{Sin}(2\pi F_j t) + \\ \frac{1}{\sqrt{2}} P(t - \tau, D_{GD} - D_{CM})\mathrm{Sin}(2\pi F_j(t - \tau)) \quad (3)$$

where $\tau$ is the relative delay between the first component and the second component. The $$\frac{1}{\sqrt{2}}$$

term comes from the assumption that the splitter 113 is a 3-dB splitter so that the power of the first component and the second component is half that of the dispersion-compensated channel wavelength signal $\lambda_j$ at the input of the splitter 113.

The photodetector 116 detects the power of its optical input and generates an electrical signal output proportional to an integral of its optical input squared, thus determining a measure of the power of the overlapping portions of the third component and the fourth component of the combined optical signal, which is passed to the controller 118.

In FIG. 2A, the photodetector 116 is implemented as a photodiode with an output current I( ) that is a function of the dispersion DCM introduced by the TDCM 108, and is proportional to the integral of the electric field of its optical input squared, i.e.

$$I(D_{CM}) \propto \int E^2_j(D_{CM}) dt \quad (4)$$

With the assumptions specified above, the output of the photodetector 116 can be expressed as $$I(D_{CM}) = \frac{1}{2} \int P^2(t, D_{GD} - D_{CM}) dt + \\ \frac{1}{2} \int P(t - \tau, D_{GD} - D_{CM}) P(t, D_{GD} - D_{CM}) dt \quad (5)$$

The output of the photodetector 116 from (5) can be expressed as $$I(D_{CM}) = \mathrm{Constant} + F(D_{GD} - D_{CM}) \quad (6)$$

The pulses 200, 202 shown in FIG. 3A illustrate examples of the pulse shapes $P(t, D_{GD} - D_{CM})$ and $P(t-\tau, D_{GD} - D_{CM})$. When the dispersion compensation applied by the TDCM 108 optimally cancels out the dispersion of the channel wavelength $\lambda_j$ signal, i.e. $D_{CM} = D_{GD}$, the pulses 200, 202 will be at their narrowest, i.e. all dispersion is removed, and hence will overlap the least. If the TDCM 108 applies a dispersion compensation that does not cancel out the dispersion of the channel wavelength $\lambda_j$ signal, i.e. $D_{CM} \neq D_{GD}$, the pulses 200,202 will be broader than the optimum case where $D_{CM} = D_{GD}$, and hence the pulses 200,202 will overlap more. Essentially, $$F_{min} = F(0) \quad (7)$$

From (6) and (7) it is clear that the output of the photodetector 116 as a function of the dispersion compensation DCM applied by the TDCM 108 will be at a minimum when the dispersion compensation DCM applied by the TDCM 108 is equal to the dispersion of the selected channel wavelength $\lambda_j$ signal, i.e. $D_{CM}=D_{GD}$.

Figure 3B:
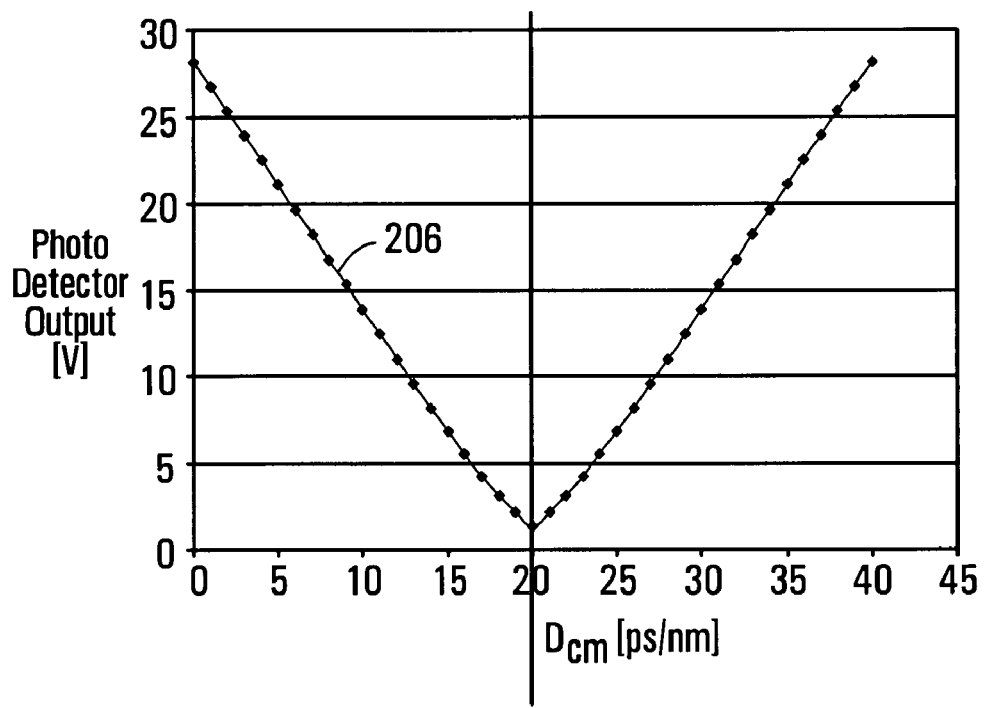
FIG. 3B is a plot of the voltage output of a square-law photodetector, as a function of dispersion compensation.

A simulation of output values 206 of the photodetector 116 over a range of dispersion compensation values $D_{CM}$ applied by the TDCM 108 is shown in FIG. 3B. In the simulation shown in FIG. 3B, the output values 206 approach a minimum when $D_{CM}=D_{GD}=20$ ps/nm. With other simulation conditions, similar or possibly different results may be achieved.

The controller 118 controls the TDCM 108 to apply a plurality of dispersion compensation values to the selected channel wavelength $\lambda_j$ signal in order to determine a dispersion compensation that results in a minimum signal output from the photodetector 116.

The differential time delay $\tau$ introduced between the first signal path 112 and the second signal path 114 of the Mach-Zehnder interferometer is set so that it is less than a bit-period of the channel wavelength signal. This results in there being some overlap in time between corresponding pulses of the first component and the second component when they are combined by the combiner 115. In general, the differential time delay $\tau$ is decreased if the bit-rate of the channel wavelength signal is increased. For example, a differential time delay $\tau$ of 5 ps may be used for a 40 Gb/s bit-rate, while a differential time delay t of 20 ps may be used for a 10 Gb/s bit-rate.

In FIG. 2A, the photodetector 116 is shown as a photodiode. In general, the photodetector 116 may be implemented by any square law power detector. For example, the photodetector 116 may be implemented by a PIN (Positive-Intrinsic-Negative) photodetector, an APD (Avalanche Photodetector) or PIN-FET (PIN-Field Effect Transistor) photodetector.

In some embodiments, the TDCM 108 is arranged after the splitter-delayer-combiner 110. An example of such an embodiment is shown in FIG. 2B. The block diagram of an optical tap 105 and an in-service dispersion determining system 100 arranged in accordance with an embodiment of the present invention shown in FIG. 2B is identical to the block diagram shown in FIG. 2A, except: the input of the splitter-delayer-combiner 110 is functionally connected to the output of the tunable filter 106; the output of the splitter-delayer-combiner 110 is functionally connected to the input of the TDCM 108; and the output of the TDCM is functionally connected to the input of the photodetector 116.

Figure 2B:
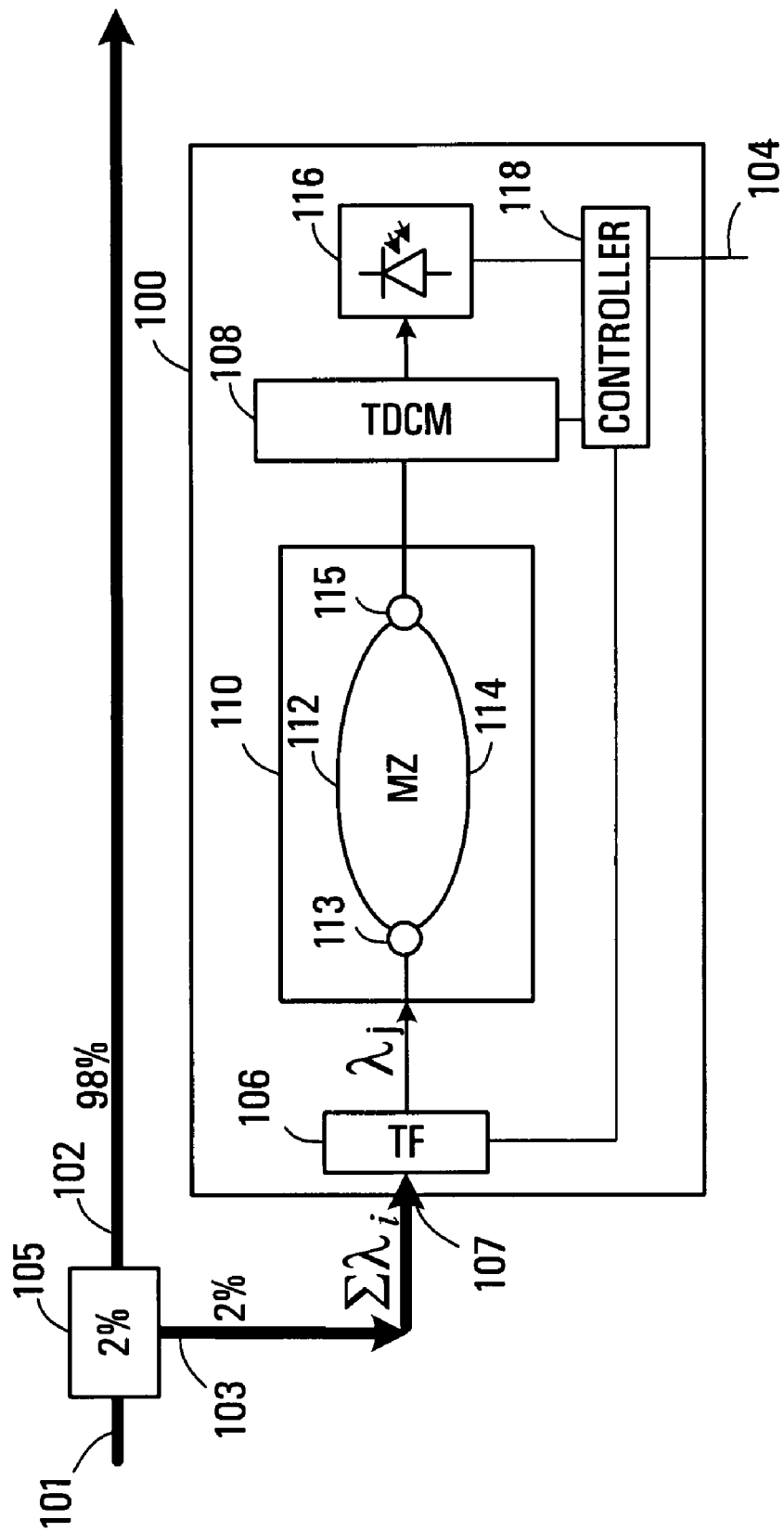
FIG. 2B is a block diagram of a dispersion determining system in accordance with an embodiment of the invention.

The operation of the in-service dispersion determining system 100 shown in FIG. 2B is identical to that of the in-service dispersion determining system 100 shown in FIG. 2A, except the TDCM 108 applies a plurality of dispersion compensation values to the combined optical signal output of the Mach-Zehnder interferometer of the splitter-delayer-combiner 110 rather than applying the plurality of dispersion compensation values to the selected channel wavelength $\lambda_j$ signal output of the tunable filter 106.

In some embodiments, the TDCM 108 may only be provided in one of the first signal path 112 and the second signal path 114 of the Mach-Zehnder interferometer of the splitter-delayer-combiner 110.

In some embodiments, the Mach-Zehnder interferometer of the splitter-delayer-combiner 110 is implemented using a polarization beam splitter 119, a polarization beam combiner 121 and a variable delay element 127. An example of such an embodiment is shown in FIG. 2C. In the embodiment shown in FIG. 2C, polarization mode dispersion of an optical signal may be determined in addition to chromatic dispersion.

Figure 2C:
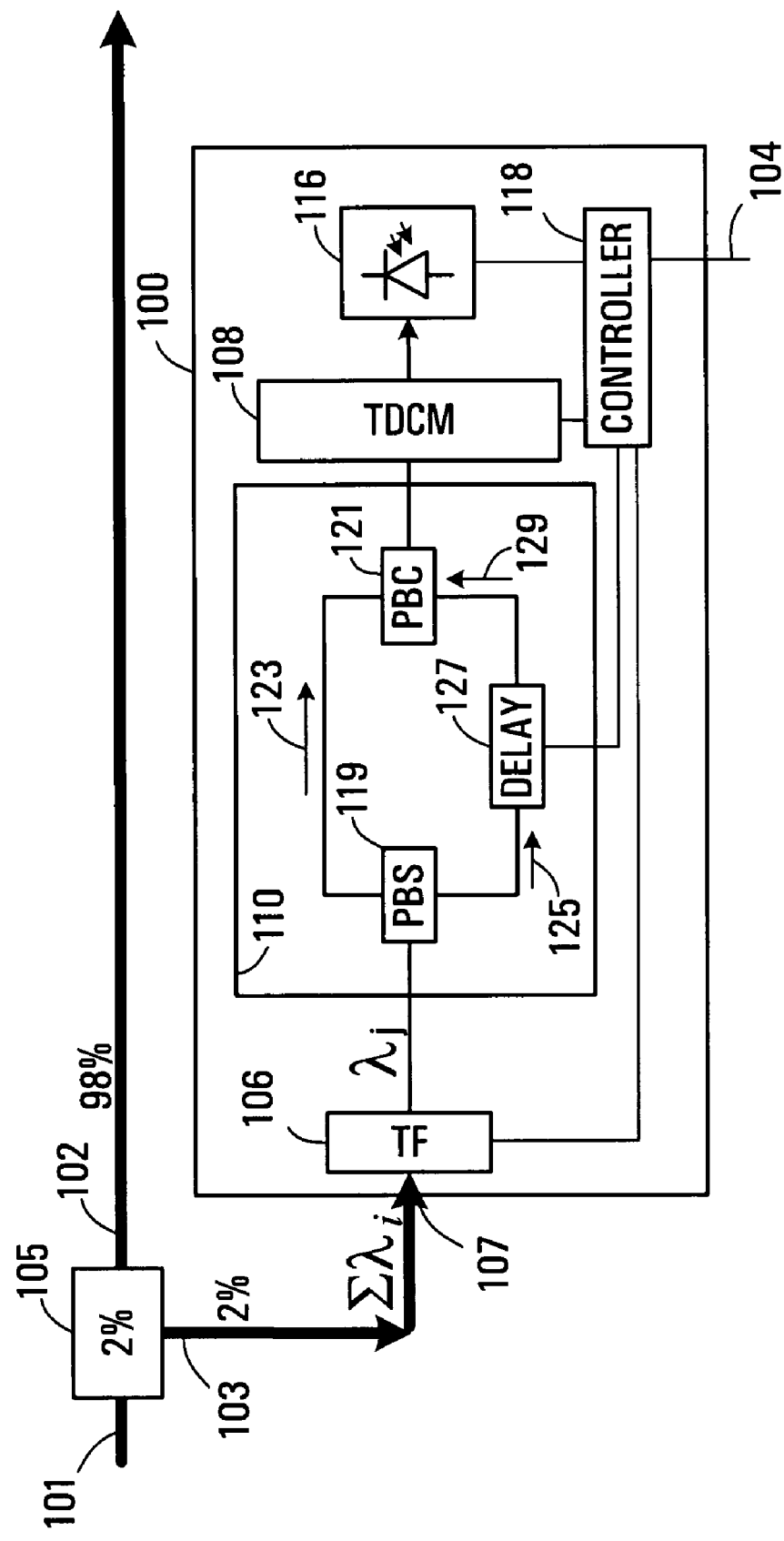
FIG. 2C is a block diagram of a dispersion determining system for individually determining polarization mode dispersion and chromatic dispersion in accordance with an embodiment of the invention.

The block diagram of an optical tap 105 and an in-service dispersion determining system 100 arranged in accordance with an embodiment of the present invention shown in FIG. 2C is identical to the block diagram shown in FIG. 2B, except: the splitter 113 is replaced with the polarization beam splitter 119, the combiner 115 is replaced with the polarization beam combiner 121, the relative delay between the first signal path 112 and the second signal path 114 is implemented with a variable delay element 127 with a variable delay $\tau_{VAR}$ and the variable delay element 127 has a control input functionally connected to the controller 118.

The operation of the in-service dispersion determining system 100 shown in FIG. 2C is similar to that of the in-service dispersion determining system 100 shown in FIG. 2B, except the polarization beam splitter 119 splits the first optical signal received at the input of the splitter-delayer-combiner 110 in to a first polarization component 123 and a second polarization component 125. The variable delay element 127 introduces a relative variable delay $\tau_{VAR}$ in the second polarization component generating a relatively delayed second polarization component 129, and the polarization beam combiner 121 combines the first polarization component and the relatively delayed second polarization component 129 to generate a combined optical signal. The controller 118 controls the TDCM 108 to apply a plurality of dispersion compensation values to the combined optical signal output of the splitter-delayer-combiner 110, and the controller 118 determines the power of the at least partially dispersion compensated combined optical signal output of the TDCM 108 for each of the plurality of dispersion compensations by monitoring the output of the photodetector 116.

PMD arises when an optical signal includes more than one polarization component and the transmission medium, for example, optical fiber, has polarization-dependent propagation velocities, i.e. a first polarization component propagates faster through the medium than a second polarization component, giving rise to a "fast" polarization component and a "slow" polarization component. By delaying the "fast" polarization component relative to the "slow" polarization component using the variable delay element 127, it is possible to align the pulses of the two polarization components.

Corresponding pulses of the first polarization component 123 and the relatively delayed second polarization component 129 will be substantially aligned when any PMD in the selected channel wavelength signal is substantially compensated for, which means that when the PMD is substantially compensated for, the plurality of dispersion compensation values applied to the combined optical signal will have little to no effect on the power of the at least partially dispersion compensated combined optical signal, i.e., the power will be substantially constant for each of the plurality of dispersion compensation values.

In order to determine if the channel wavelength selected by tunable filter 106 includes any PMD, and the value of the PMD if it is present, the controller 118 adjusts the variable delay element 127 until the relative delay time $\tau_{VAR}$ introduced by the variable delay element 127 substantially compensates for any PMD in the channel wavelength signal selected by the tunable filter 106. The controller determines when the PMD has been substantially compensated for by monitoring the power of the at least partially dispersion compensated combined optical signal output of the TDCM 108 with the photodetector 116 to determine a relative delay time $\tau_{VAR}$ that results in the power of the at least partially dispersion compensated combined optical signal being substantially equal for each of the plurality of dispersion compensation values.

If no PMD is present in the selected channel wavelength, then the pulses of the first polarization component 123 and the second polarization component 125 will be aligned in time, i.e. there is no offset between the pulses due to PMD. Therefore, when the relative delay time $\tau_{VAR}$ is set to zero, if the power of the optical signal output of the TDCM 108 is substantially constant for each compensation value of the plurality of dispersion compensation values, then it can be determined that the selected channel wavelength does not contain a significant amount of PMD. Accordingly, it is possible to determine if there is PMD in the selected channel wavelength simply by setting the relative time delay $\tau_{VAR}$ equal to zero, i.e. no delay, applying the plurality of dispersion compensation values and determining if the power of the output of the TDCM 108 is substantially constant for each of the plurality of dispersion compensation values. If the power is not substantially constant, then there is some offset between the first polarization component 123 and the second component 125 that is potentially the result of PMD that may have to be compensated for.

Once the PMD for a channel wavelength selected by the tunable filter 106 has been determined, i.e., the variable delay element 127 has been adjusted such that the corresponding pulses of the first polarization component 123 and the relatively delayed second polarization component 129 are substantially aligned, i.e. $\tau_{VAR} = \tau_{PMD}$, then the chromatic dispersion of the selected channel wavelength may be determined by adjusting the variable time delay element 127 so that the corresponding pulses of the first polarization component 123 and the relatively delayed second polarization component 129 are offset by a specific amount $\tau$, causing them to partially overlap in time, and then determining the dispersion in a manner similar to that described above with reference to the embodiment shown in FIG. 2B. That is, applying each of the plurality of dispersion compensation values sequentially to the combined optical signal output of the splitter-delayer-combiner 110, which in the embodiment shown in FIG. 2C is the output of the polarization beam combiner 121, determining power of the output of the TDCM 108 for each of the plurality of dispersion compensation values, and determining that the chromatic dispersion of the selected channel wavelength is substantially equal to a dispersion compensation of the plurality of dispersion compensations that results in a minimum detected power of the at least partially dispersion compensated combined optical signal output of the TDCM 108.

In some embodiments, the offset introduced by a variable delay element to determine chromatic dispersion is bitrate-dependent.

In some embodiments, the TDCM 108 is provided in one of the first signal path 112 and the second signal path 114 of the Mach-Zehnder interferometer of the splitter-delayer-combiner 110 shown in FIGS. 2A, 2B and 2C.

In general, the TDCM 108 is arranged so that the plurality of dispersion compensation values are applied to at least one of: the first polarization component; the second polarization component; the relatively delayed first polarization component, when a variable delay element is located in the first signal path 112; and the relatively delayed second polarization component, when a variable delay element is located in the second signal path 114.

Figure 4:
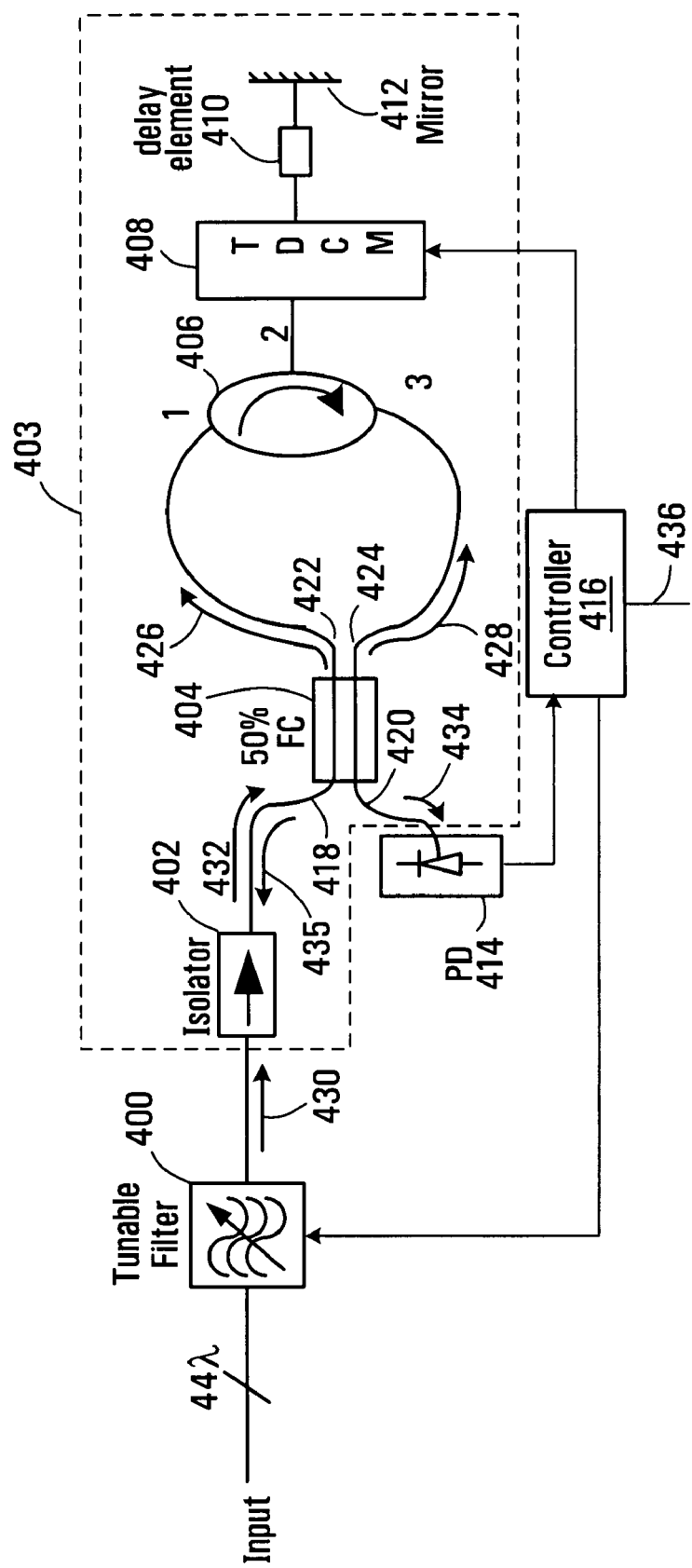
FIG. 4 is a block diagram of a dispersion determining system in accordance with an embodiment of the invention.
Figure 5:
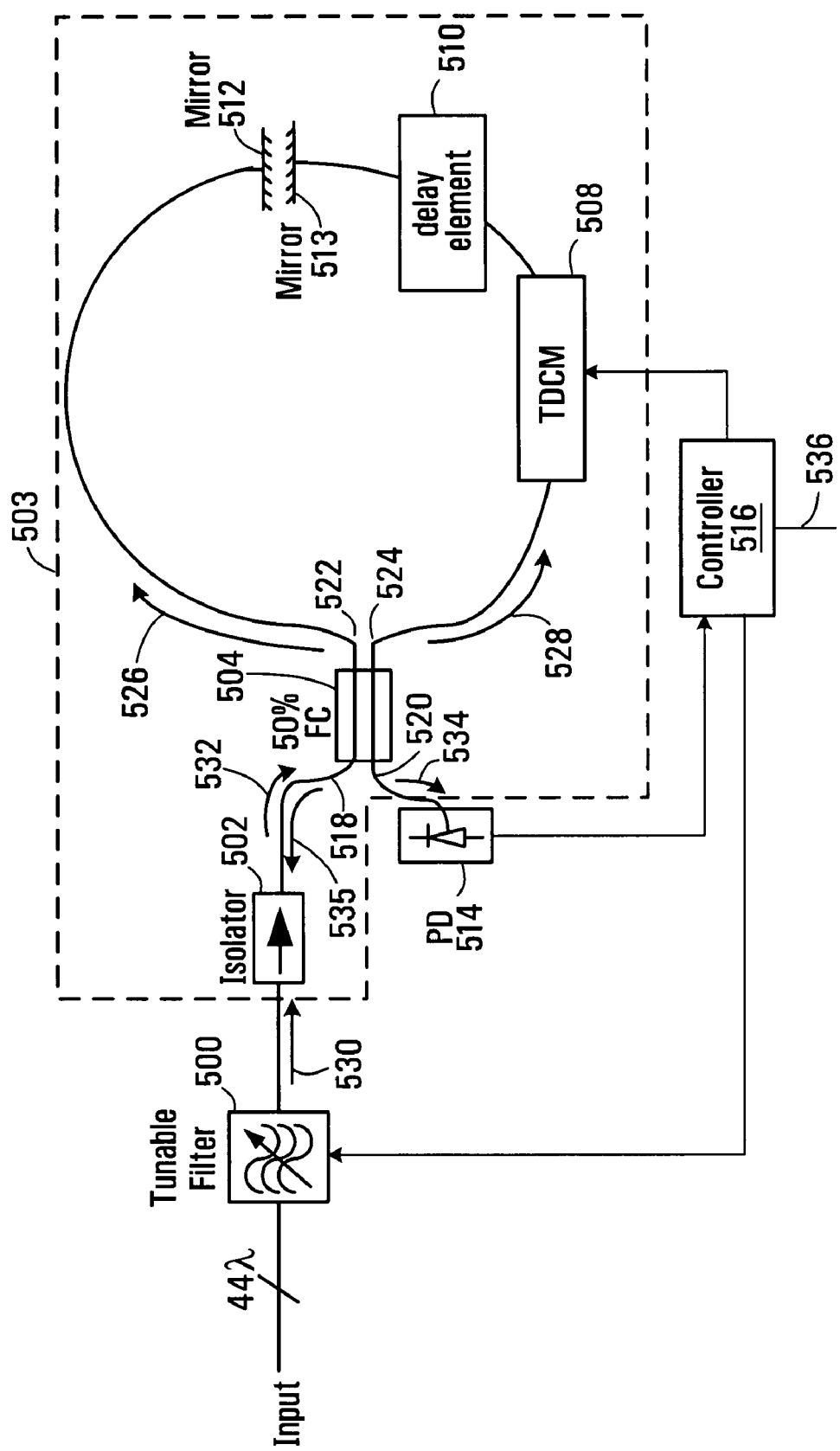
FIG. 5 is a block diagram of a dispersion determining system in accordance with an embodiment of the present invention.

In some embodiments, the splitting and combining functionality of the splitter-delayer-combiner are implemented by a single component, for example, a four-port optical coupler, such as a 3-dB fiber coupler. FIGS. 4 and 5 show alternative implementations of an in-service dispersion determining system arranged in accordance with embodiments of the present invention in which a four-port optical coupler, specifically a 3-dB fiber coupler, is used to split a first optical signal into a first component and a second component, and to combine the first component and the second component to generate a combined optical signal.

The example of an in-service dispersion determining system shown in FIG. 4 includes a tunable filter 400, a splitter-delayer-combiner 403, a TDCM 408, a photodetector 414 and a controller 416. In the example embodiment shown in FIG. 4, the splitter-delayer-combiner 403 includes an optical isolator 402, a 3-dB fiber coupler 404, a circulator 406, a delay element 410 and a mirror 412.

The tunable filter 400 has an input, an output functionally connected to an input of the optical isolator 402 and a control input functionally connected to a first control output of the controller 416.

The optical isolator 402 has an output that is functionally connected to a first port 418 of the 3-dB fiber coupler 404.

A second port 420 of the 3-dB fiber coupler 404 is functionally connected to an input of the photodetector 414.

The photodetector 414 has an output that is functionally connected to a measurement input of the controller 416.

The 3-dB fiber coupler 404 also has a third port 422 and a fourth port 424 that are respectfully functionally connected to a first port and a third port of the circulator 406.

A second port of the circulator 406 is functionally connected to a first port of the TDCM 408.

The TDCM has a control input that is functionally connected to a second control output of the controller 416.

A second port of the TDCM is functionally connected to a first port of a delay element 410. A second port of the delay element 410 is functionally connected to a mirror 412.

In operation, as an example only, it is assumed that an input optical signal with 44 channel wavelengths is received at the input of the tunable filter 400. More generally, an optical signal with any number of channel wavelengths may be handled by embodiments of the present invention.

The controller 416 controls the tunable filter 400 to select one of the channel wavelengths from the input optical signal by filtering out the remaining 43 channel wavelengths to produce a selected channel wavelength signal 430.

The optical isolator 402 permits an optical signal to pass from its input to its output and block all optical signals from propagating backward from its output to its input. The isolator 402 allows the selected channel wavelength signal 430 to pass to the first port 418 of the 3-dB fiber coupler 404 as the isolated selected channel wavelength signal 432, and prevents any optical signal from passing from the first port 418 of the 3-dB optical coupler 404 to the output of the tunable filter 400.

The 3-dB fiber coupler 404 is operable to couple the isolated selected channel wavelength signal 432 received on its first port 418 to both its third port 422 and its fourth port 424, as a first component 426 and a second component 428, respectively. The 3-dB fiber coupler 404 passes half of the power of the isolated selected channel wavelength signal 432 to its third port 422 as the first component 426, and the other half of the power of the isolated selected channel wavelength signal 432 to its fourth port 424 as the second component 428.

The circulator 406 receives the first component 426 on its first port and passes the first component 426 via its second port to the first port of the TDCM 408.

The TDCM 408 applies a dispersion compensation to the first component 426 under the control of the controller 416 and passes the at least partially dispersion-compensated first component to the delay element 410.

The delay component 410 introduces a relative delay τ and passes the delayed and dispersion-compensated first component to the mirror 412.

The mirror 412 reflects substantially all of the delayed and dispersion-compensated first component back to the delay element 410, which passes the delayed and dispersion-compensated first component back to the TDCM 408.

The TDCM 408 passes the delayed and dispersion-compensated first component back to the second port of the circulator 406, which passes the delayed and dispersion-compensated first component received on its second port to the fourth port 424 of the 3-dB fiber coupler 404 via the third port of the circulator 406.

In some embodiments, the TDCM 408 and the delay element 410 introduce a dispersion compensation and a delay, respectively, in both directions of propagation, i.e. from their first ports to their second ports and from their second ports to their first ports. Therefore, in these embodiments, the first component 426 passed to the first port of the TDCM 408 from the second port of the circulator 406 will be dispersion compensated and delayed twice before it is received again at the second port of the circulator 406.

The circulator 406 receives the second component 428 on its third port and passes the second component 428 to the third port 422 of the 3-dB fiber coupler 404 via the first port of the circulator 406.

The 3-dB fiber coupler 406 combines the delayed and dispersion-compensated first component received on its fourth port 424 and the second component 428 received on its third port 422 and passes half of the power of the resulting combined optical signal to its first port 418 as a combined optical signal 435 and half of the power of the resulting combined optical signal to its second port 420 as a combined optical signal 434.

The isolator 402 prevents the combined optical signal 435 from the first port 418 of the 3-dB fiber coupler 404 from reaching the output of the tunable filter 400.

The combined optical signal 434 from the second port 420 of the 3-dB fiber coupler 404 is received at the input of the photodetector 414, which is shown as a photodiode in FIG. 4.

The photodiode of the photodetector 414 detects the power of the combined optical signal 434 by, in effect, squaring and integrating an electric field of the combined optical signal 434 received on its optical input. The photodetector 414 produces an electrical signal proportional to the power of the combined optical signal 434, which is monitored by the controller 416.

Although the TDCM 408 only applies dispersion compensation to the first component 426, the output of the photodetector 414 will still be at a minimum when the dispersion $D_{GD}$ of the first component 426 is effectively cancelled by the dispersion compensation $D_{CM}$ applied by the TDCM 408. The controller 416 controls the TDCM 408 to apply a plurality of dispersion compensation values to the first component 426 in order to determine a dispersion compensation that results in a minimum signal output from the photodetector 414.

FIG. 5 shows a block diagram of an in-service dispersion determining system that is similar to the in-service dispersion determining system shown in FIG. 4. The in-service dispersion determining system shown in FIG. 5 includes a tunable filter 500, a splitter-delayer-combiner 503, a TDCM 508, a photodetector 514 and a controller 516. In the example embodiment shown in FIG. 5, the splitter-delayer-combiner 503 includes an optical isolator 502, a 3-dB fiber coupler 504, a delay element 510, a first mirror 512, and a second mirror 513.

The tunable filter 500 has an input, an output functionally connected to an input of the optical isolator 502 and a control input functionally connected to a first control output of the controller 516.

The optical isolator 502 has an output that is functionally connected to a first port 518 of the 3-dB fiber coupler 504.

A second port 520 of the 3-dB fiber coupler 504 is functionally connected to an input of the photodetector 514.

The photodetector 514 has an output that is functionally connected to a measurement input of the controller 516.

The 3-dB fiber coupler 504 also has a third port 522 and a fourth port 524 that are respectfully functionally connected to the first mirror 512 and a first port of the TDCM 508.

A second port of the TDCM 508 is functionally connected to a first port of the delay element 510.

A second port of the delay element 510 is functionally connected to the second mirror 513.

In operation, as an example only, and as in the description of the operation of FIG. 4 above, it is assumed that an input optical signal with 44 channel wavelengths is received at the input of the tunable filter 500. More generally, an optical signal with any number of channel wavelengths may be handled by embodiments of the present invention.

The controller 516 controls the tunable filter 500 to select one of the channel wavelengths from the input optical signal by filtering out the remaining 43 channel wavelengths to produce a selected channel wavelength signal 530.

The optical isolator 502 permits an optical signal to pass from its input to its output and block all optical signals from propagating backward from its output to its input. The isolator 502 allows the selected channel wavelength signal 530 to pass to the first port 518 of the 3-dB fiber coupler 504 as the isolated selected channel wavelength signal 532, and prevents any optical signal from passing from the first port 518 of the 3-dB optical coupler 504 to the output of the tunable filter 500.

The 3-dB fiber coupler 504 is operable to couple the isolated selected channel wavelength signal 532 received on its first port 518 to both its third port 522 and its fourth port 524, as a first component 526 and a second component 528, respectively. The 3-dB fiber coupler 504 passes half of the power of the isolated selected channel wavelength signal 532 to its third port 522 as the first component 526, and the other half of the power of the isolated selected channel wavelength signal 532 to its fourth port 524 as the second component 528.

The first component 526 propagates to, and is substantially entirely reflected by, the first mirror 512 so that the first component returns to the third port 522 of the 3-dB fiber coupler 504.

The second component 528 propagates to the first port of the TDCM 508.

The TDCM 508 applies a dispersion compensation to the second component 528 under the control of the controller 516 and passes an at least partially dispersion-compensated second component to the delay element 510.

The delay component 510 introduces a predetermined delay τ and passes a delayed and dispersion-compensated second component to the second mirror 513.

The second mirror 513 reflects substantially all of the delayed and dispersion-compensated second component back to the delay element 510, which passes the delayed and dispersion-compensated second component back to the TDCM 508.

The TDCM 508 passes the delayed and dispersion-compensated second component back to the fourth port 524 of the 3-dB fiber coupler 504.

In some embodiments, the TDCM 508 and the delay element 510 introduce a dispersion compensation and a delay, respectively, in both directions of propagation, i.e. from their first ports to their second ports and from their second ports to their first ports. Therefore, in these embodiments, the second component 528 passed to the first port of the TDCM 508 from the fourth port of the 3-dB fiber coupler 504 will be dispersion compensated and delayed twice before it is received again at the fourth port of the 3-dB fiber coupler 504.

The 3-dB fiber coupler 504 combines the delayed and dispersion-compensated second component received on its fourth port 524 and the first component 526 received on its third port 522 and passes half of the power of the resulting combined optical signal to its first port 518 as a combined optical signal 535 and half of the power of the resulting combined optical signal to its second port 520 as a combined optical signal 534.

The isolator 502 prevents the combined optical signal 535 from the first port 518 of the 3-dB fiber coupler 504 from reaching the output of the tunable filter 500.

The combined optical signal 534 from the second port 520 of the 3-dB fiber coupler 504 is received at the input of the photodetector 514, which, similar to FIG. 4, is shown as a photodiode in FIG. 5.

The photodiode of the photodetector 514 detects the power of the combined optical signal 534 by, in effect, squaring and integrating an electric field of the combined optical signal 534 received on its optical input. The photodetector 514 produces an electrical signal proportional to the power of the combined optical signal 534, which is monitored by the controller 516.

Although the TDCM 508 only applies dispersion compensation to the second component 528, the output of the photodetector 514 will still be at a minimum when the dispersion $D_{GD}$ of the second component 528 is effectively cancelled by the dispersion compensation $D_{CM}$ applied by the TDCM 508. The controller 516 controls the TDCM 508 to apply a plurality of dispersion compensation values to the second component 528 in order to determine a dispersion compensation that results in a minimum signal output from the photodetector 514.

In some embodiments, the controllers 416,516 shown in FIGS. 4 and 5 also have control ports 436,536 that may be used to externally control the operation of the controllers 416,516 and/or to report determined dispersions to other network components, databases and/or user displays.

While a 3-dB fiber coupler is shown in FIGS. 4 and 5, more generally, any four port optical coupler that is operable to couple an optical signal from its first port to its third and fourth ports, and operable to couple optical signals from its third and fourth ports to its second port, may be used.

In some embodiments, the functional connection between the third port of a four port optical coupler, such as the 3-dB fiber coupler 404, and the first port of the circulator 406 is provided by a length of optical fiber.

In some embodiments, the functional connection between the fourth port of the four port optical coupler and the third port of the circulator is provided by a length of optical fiber.

While tunable filters 106,400,500 have been used in the implementations shown in FIGS. 2A, 2B, 4 and 5, more generally, any kind of channel-wavelength selector that allows for the selection of individual channel wavelengths from a plurality of channel wavelengths may be used.

The TDCM 408 is shown as being functionally connected between the second port of the circulator 406 and the first port of the delay element 410 in FIG. 4, and the TDCM 508 is shown as being functionally connected between the fourth port 524 of the 3-dB fiber coupler 504 and the first port of the delay element 510 in FIG. 5.

More generally, a TDCM may be located anywhere such that the TDCM is operable to adjust the dispersion of at least one of the third component and the fourth component of the combined optical signal input of the photodetector 414,514, i.e. in the combined optical signal 434,534 from the second port 420,520 of the 3-dB fiber coupler 404,504.

For example, the TDCM may be arranged so that it is operable to apply a plurality of dispersion compensation values to any one of the following signals: the selected channel wavelength signal 430,530, the combined optical signal 434, 534, and at least one of the first component 426,526 and the second component 428,528.

In some embodiments, a TDCM is functionally connected between the isolator 402 and the first port 418 of the 3-dB fiber coupler 404.

In some embodiments, a TDCM is functionally connected between the second port 420 of the 3-dB fiber coupler 404 and the input of the photodetector 414.

In some embodiments, a TDCM is functionally connected between the isolator 502 and the first port 518 of the 3-dB fiber coupler 504.

In some embodiments, a TDCM is functionally connected between the second port 520 of the 3-dB fiber coupler 504 and the input of the photodetector 514.

The tuning range of a TDCM used in embodiments of the present invention is an implementation specific detail, as different systems will have different amounts of dispersion. In general, the range of dispersions that can be determined corresponds to the tuning range of the TDCM. Therefore, if larger dispersions are to be determined, a TDCM with a wider tuning range may be used.

In some embodiments, a TDCM with a tuning range of +/−1500 ps/nm is used.

It should be noted that for the embodiments shown in FIGS. 2A, 2B, 4 and 5, only the signals to and/or from the controllers 118, 416, 516 are electrical, all of the other signals are optical.

While the systems and method described above have been described in the context of optical dispersion determination, they are equally applicable as part of optical dispersion compensation systems and methods in which it is advantageous to determine the optical dispersion in order to compensate for it.

What has been described is merely illustrative of the application of the principles of the invention. Other arrangements and methods can be implemented by those skilled in the art without departing from the spirit and scope of the present invention.

The invention claimed is:

1. A method carried out by an optical receiving component, the method comprising the steps of:
splitting a first optical signal into a first polarization component and a second polarization component;
introducing a relative delay time τ between the first polarization component and the second polarization component;
combining the relatively delayed first and second polarization components to generate a combined optical signal;
applying each of a plurality of dispersion compensation values such that dispersion of at least one of:
a) the first polarization component of the combined optical signal; and
b) the second polarization component of the combined optical signal,
is affected by each dispersion compensation value;

determining power of the combined optical signal while each of the plurality of dispersion compensation values are applied; and determining a dispersion compensation value of the plurality of dispersion compensation values that results in a minimum detected power of the combined optical signal.

2. The method of claim 1, further comprising determining that polarization mode dispersion of the first optical signal is substantially equal to the dispersion compensation value of the plurality of dispersion compensation values that results in the minimum detected power of the combined optical signal.

3. The method of claim 2 further comprising a step of:
selecting a channel wavelength signal from a first wavelength division multiplexed optical signal comprising a plurality of channel wavelength signals, wherein the first optical signal comprises the channel wavelength signal.

4. The method of claim 3 wherein the steps of the method are repeated for each channel wavelength signal of the plurality of channel wavelength signals of the first wavelength division multiplexed optical signal.

5. The method of claim 3 wherein the step of selecting a channel wavelength signal from a first wavelength division multiplexed optical signal comprising a plurality of channel wavelength signals comprises:
selectively filtering the first wavelength division multiplexed optical signal to pass only the channel wavelength signal.

6. The method of claim 3 further comprising a step of:
tapping a second wavelength division multiplexed optical signal to generate the first wavelength division multiplexed optical signal.

7. The method of claim 2 further comprising a step of:
tapping a second optical signal to generate the first optical signal.

8. The method of claim 1 wherein the step of determining power of the combined optical signal comprises squaring and integrating the electric field of the combined optical signal.

9. The method of claim 1 wherein the delay time $\tau$ is bit-rate dependent.

10. An optical receiving component comprising:
a splitter-delayer-combiner that:
splits a first optical signal into a first polarization component and a second polarization component;
introduces a relative time delay $\tau$ between the first polarization component and the second polarization component; and
combines the relatively delayed first and second polarization components to generate a combined optical signal;
a tunable dispersion compensation module (TDCM) that applies each of a plurality of dispersion compensation values such that dispersion of at least one of:
a) the first polarization component of the combined optical signal; and
b) the second polarization component of the combined optical signal,
is affected by each dispersion compensation value;
a power detector that detects power of the combined optical signal while the TDCM applies the plurality of dispersion compensation values; and
a controller that controls the TDCM and determines a dispersion compensation value of the plurality of dispersion compensation values that results in a minimum detected power of the combined optical signal.

11. The system of claim 10 further comprising a splitter-delayer-combiner, wherein:
the controller also determines that dispersion of a first optical signal is substantially equal to the dispersion compensation value of the plurality of dispersion compensation values that results in the minimum detected power of the combined optical signal;
the TDCM applies each of the plurality of dispersion compensation values to the first optical signal to generate an at least partially dispersion compensated first optical signal; and
the combined optical signal comprising the first component and the second component is generated by the splitter-delayer-combiner that:
splits the at least partially dispersion compensated first optical signal into a third component and a fourth component;
introduces a relative delay time $\tau$ between the third component and the fourth component; and
combines the relatively delayed third and fourth components to generate the combined optical signal comprising the first component and the second component.

12. The optical receiving component of claim 10, wherein:
the controller also determines that polarization mode dispersion of the first optical signal is substantially equal to the dispersion compensation value of the plurality of dispersion compensation values that results in the minimum detected power of the combined optical signal.

13. The optical receiving component of claim 12 further comprising an optical tap that taps a second optical signal to generate the first optical signal.

14. The optical receiving component of claim 12 further comprising:
a channel-wavelength selector that selects a channel wavelength of a first wavelength division multiplexed (WDM) optical signal comprising a plurality of channel wavelengths to generate the first optical signal, wherein the controller controls the channel-wavelength selector to select the channel wavelength from the plurality of channel wavelengths to generate the first optical signal.

15. The optical receiving component of claim 14, wherein the channel-wavelength selector comprises a tunable filter that selects the channel wavelength by filtering the other channel wavelengths of the plurality of channel wavelengths.

16. The optical receiving component of claim 14, further comprising an optical tap that taps a second WDM optical signal to generate the first WDM optical signal.

17. The optical receiving component of claim 12 wherein the splitter-delayer-combiner comprises a Mach-Zehnder interferometer.

18. The optical receiving component of claim 17 wherein the Mach-Zehnder interferometer comprises:
a polarization beam splitter that splits the first optical signal into the first polarization component and the second polarization component along a first signal path and a second signal path, respectively;
a variable delay element with a variable time delay $\tau_{var}$ in one of the first signal path and the second signal path that introduces the relative delay time $\tau$ between the first polarization component and the second polarization component; and
a polarization beam combiner that combines the relatively delayed first and second polarization components to generate the combined optical signal, wherein
the controller determines an amount of polarization mode dispersion time delay $\tau_{pmd}$ in the first optical signal by:

setting the variable time delay $\tau_{var}$ to a plurality of different values;

applying the plurality of dispersion compensation values for each value of the variable time delay $\tau_{var}$;

determining a variable time delay value $\tau_{var}$ of the plurality of variable time delay values for which the detected power of the combined optical signal is substantially equal for each of the plurality of dispersion compensation values;

determining that the amount of polarization mode dispersion time delay $\tau_{pmd}$ in the first optical signal is equal to the variable time delay value $\tau_{var}$ for which the detected power of the combined optical signal is substantially equal for each of the plurality of dispersion compensation values; and setting the variable time delay element such that $\tau_{var}=\tau_{pmd}+\tau$, wherein the relative time delay $\tau$ is introduced between the first polarization component and the second polarization component of the combined optical signal.

19. The optical receiving component of claim 10 further comprising a square law power detector that determines the power of the combined optical signal.

20. A method comprising the steps of:
splitting a first optical signal into a first polarization component and a second polarization component;

introducing a relative variable delay time $\tau_{var}$ between the first polarization component and the second polarization component;

combining the relatively delayed first and second polarization components to generate a combined optical signal;

determining power of the combined optical signal while applying a plurality of dispersion compensation values to the combined optical signal;

adjusting the relative variable delay time $\tau_{var}$ until the power of the combined optical signal is substantially equal for each of the plurality of dispersion compensation values;
and determining that an amount of PMD (polarization mode dispersion) in the first optical signal resulting in a time delay $\tau_{pmd}$ between the first polarization component and the second polarization component of the combined optical signal is equal to the relative variable delay time $\tau_{var}$ for which the power of the combined optical signal is substantially equal for each of the plurality of dispersion compensation values.

21. The method of claim 20 further comprising a step of:
selecting a channel wavelength signal from a first wavelength division multiplexed optical signal comprising a plurality of channel wavelength signals, wherein
the first optical signal comprises the channel wavelength signal.

22. The method of claim 21 wherein the steps of the method are repeated for each channel wavelength signal of the plurality of channel wavelength signals of the first wavelength division multiplexed optical signal.

23. The method of claim 21 wherein the step of selecting a channel wavelength signal from a first wavelength division multiplexed optical signal comprising a plurality of channel wavelength signals comprises:
selectively filtering the first wavelength division multiplexed optical signal to pass only the channel wavelength signal.

24. The method of claim 21 further comprising a step of:
tapping a second wavelength division multiplexed optical signal to generate the first wavelength division multiplexed optical signal.

25. The method of claim 20 further comprising a step of:
tapping a second optical signal to generate the first optical signal.

26. The method of claim 20 wherein the step of determining power of the combined optical signal comprises squaring and integrating the electric field of the combined optical signal.

27. The method of claim 20 further comprising:
introducing a relative delay time $\tau$ between the first polarization component and the second polarization component of the combined optical signal by setting the relative variable time delay $\tau_{var}=\tau_{pmd}+\tau$;

applying the plurality of dispersion compensation values while $\tau_{var}=\tau_{pmd}+\tau$;

determining that chromatic dispersion of the first optical signal is substantially equal to a dispersion compensation value of the plurality of dispersion compensation values that are applied while $\tau_{var}=\tau_{pmd}+\tau$ that results in a minimum detected power of the combined optical signal.

28. The method of claim 27 wherein the relative variable delay time $\tau$ is bit-rate dependent.

* * * * *